United States Patent
Selby et al.

(10) Patent No.: US 12,552,752 B2
(45) Date of Patent: Feb. 17, 2026

(54) ATROPISOMERS OF PYRIDAZINONE DERIVATIVES AS HERBICIDES

(71) Applicant: FMC Corporation, Philadelphia, PA (US)

(72) Inventors: Thomas Paul Selby, Hockessin, DE (US); John Robbins Debergh, Middletown, DE (US); Thomas Martin Stevenson, Newark, DE (US); Stephen Frederick Mccann, Newark, DE (US)

(73) Assignee: FMC Corporation, Philadelphia, PA (US)

( * ) Notice: Subject to any disclaimer, the term of this patent is extended or adjusted under 35 U.S.C. 154(b) by 572 days.

(21) Appl. No.: 17/916,085

(22) PCT Filed: Mar. 31, 2021

(86) PCT No.: PCT/US2021/025240
§ 371 (c)(1),
(2) Date: Sep. 30, 2022

(87) PCT Pub. No.: WO2021/202787
PCT Pub. Date: Oct. 7, 2021

(65) Prior Publication Data
US 2023/0150945 A1    May 18, 2023

Related U.S. Application Data

(60) Provisional application No. 63/003,888, filed on Apr. 1, 2020.

(51) Int. Cl.
| | | |
|---|---|---|
| *C07D 237/16* | (2006.01) | |
| *A01N 43/58* | (2006.01) | |
| *A01P 13/02* | (2006.01) | |

(52) U.S. Cl.
CPC ........... *C07D 237/16* (2013.01); *A01N 43/58* (2013.01); *A01P 13/02* (2021.08); *C07B 2200/07* (2013.01)

(58) Field of Classification Search
CPC combination set(s) only.
See application file for complete search history.

(56) References Cited

U.S. PATENT DOCUMENTS

2020/0171001 A1\*  6/2020  Rice ................. A61P 35/02
2021/0221823 A1\*  7/2021  Kettle ................ C07D 498/14

FOREIGN PATENT DOCUMENTS

WO    2015/168010 A1    10/2021

OTHER PUBLICATIONS

Zask, Arie et al. "Biological Stereoselectivity of Atropisomeric Natural Producets and Drugs" Chirality vol. 25, No. 5, May 1, 2013, pp. 265-274 XP055808412.

\* cited by examiner

*Primary Examiner* — John Pak
(74) *Attorney, Agent, or Firm* — D. Andrew Travis

(57) ABSTRACT

The present disclosure provides atropisomers of pyridazinone derivatives of a compound of Formula 1a and Formula 1b, N-oxides or salts thereof, wherein $R^1$, $R^2$, $R^3$, $R^4$ and $R^5$ are defined in the disclosure. Also disclosed is a composition containing a compound of Formula 1a or 1b, and methods for controlling undesired vegetation comprising contacting the undesired vegetation or its environment with an effective amount of a compound of Formula 1a or 1b or a composition thereof. Also disclosed are methods for preparing a compound of Formula I.

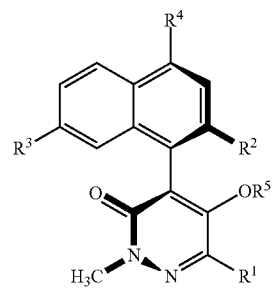

1a

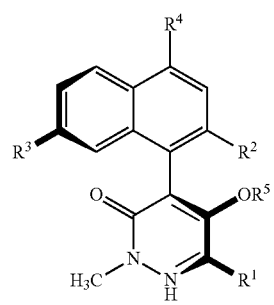

1b

10 Claims, 1 Drawing Sheet

ATROPISOMERS OF PYRIDAZINONE DERIVATIVES AS HERBICIDES

FIELD OF THE INVENTION

The present disclosure relates to stereoisomers of certain pyridazinone derivatives, their N-oxides, salts and compositions, and methods of their use for controlling undesirable vegetation. More specifically, the present disclosure relates to atropisomers of certain pyridazinone derivatives, their N-oxides, salts and compositions, and methods of their use as herbicides.

BACKGROUND OF THE INVENTION

The control of undesired vegetation is extremely important in achieving high crop efficiency. Achievement of selective control of the growth of weeds especially in such useful crops as rice, soybean, sugar beet, maize, potato, wheat, barley, tomato and plantation crops, among others, is very desirable. Unchecked weed growth in such useful crops can cause significant reduction in productivity and thereby result in increased costs to the consumer. The control of undesired vegetation in noncrop areas is also important. Many products are commercially available for these purposes, but the need continues for new compounds that are more effective, less costly, less toxic, environmentally safer or have different sites of action.

WO 2015/168010 and WO 2017/074988 disclose herbicidal pyridazinones and synthetic intermediates used to prepare herbicidal pyridazinones.

SUMMARY OF THE INVENTION

The present disclosure provides optically active atropisomers of pyridazinone derivatives of a compound of Formula 1a and Formula 1b, N-oxides or salts thereof; a compound of Formula 1 is a racemic mixture of an atropisomer of Formula 1a and an atropisomer of Formula 1b.

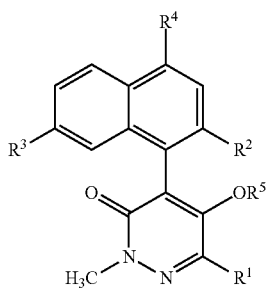

(Racemate of 1a and 1b)

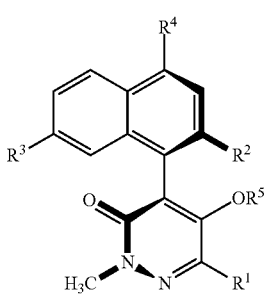

1a

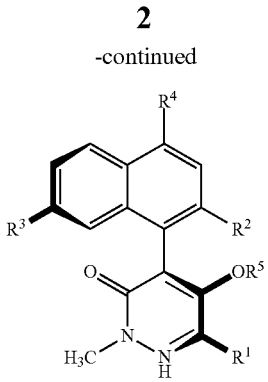

1b wherein
R$^1$ is CH$_3$ or halogen;
R$^2$ is CH$_3$, CH$_2$CH$_3$, halogen, trifluoromethyl or difluoromethoxy;
R$^3$ is H, CH$_3$ or halogen;
R$^4$ is H, CH$_3$ or halogen;
R$^5$ is H, C$_1$-C$_4$ alkylcarbonyl, C$_1$-C$_4$ alkoxycarbonyl or C$_1$-C$_4$ alkycarboxymethyl; wherein
the atropisomer of Formula 1a or 1b, an N-oxide or salt thereof, is present in excess of its corresponding enantiomer or an N-oxide or salt thereof;

In another aspect, the present disclosure provides a process for preparing a compound of Formula 1a or 1b;

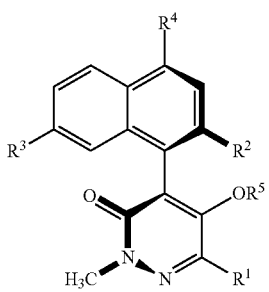

1a

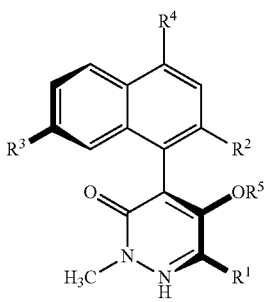

1b wherein
R$^1$ is CH$_3$ or halogen;
R$^2$ is CH$_3$, CH$_2$CH$_3$, halogen, trifluoromethyl or difluoromethoxy;
R$^3$ is H, CH$_3$ or halogen;
R$^4$ is H, CH$_3$ or halogen;
R$^5$ is H, C$_1$-C$_4$ alkylcarbonyl, C$_1$-C$_4$ alkoxycarbonyl or C$_1$-C$_4$ alkycarboxymethyl; the process comprising:
1) loading a racemic mixture of a compound of Formula 1 comprising the atropisomers of Formulae 1a and 1b onto a chiral supported chromatography column and eluting with a mobile phase;

2) isolating two separate fractions with different retention times; one containing an atropisomer with a positive optical rotation value $[\alpha]_1$ (+), and one atropisomer with a negative optical rotation value $[\alpha]_1$ (−).

DETAILED DESCRIPTION OF THE INVENTION

Figure 1:
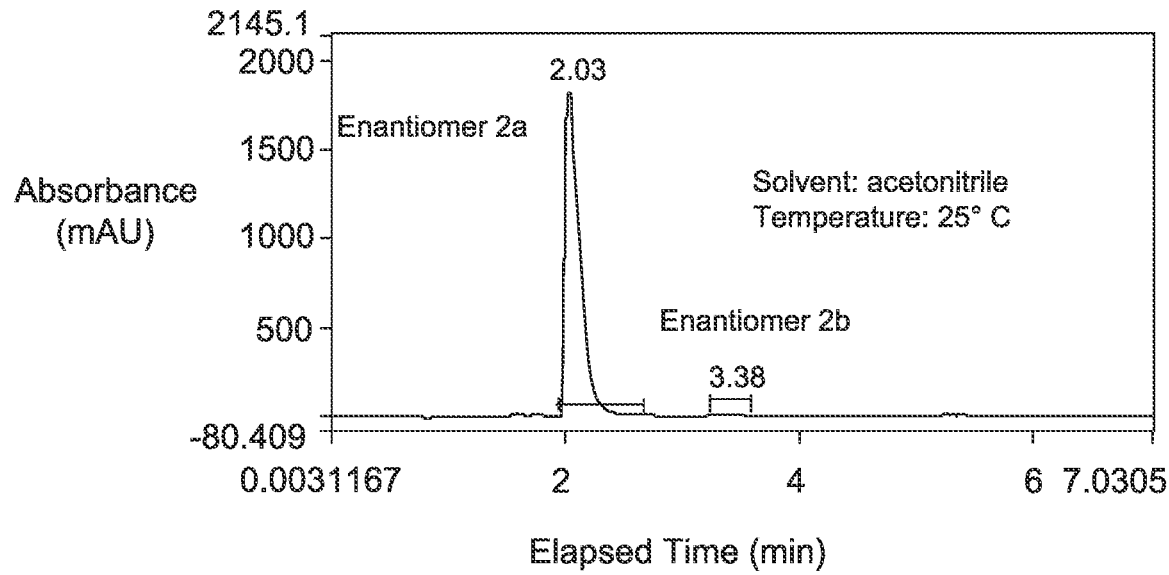
FIG. 1 (Analytical Chiral HPLC SFC Chromatogram of Enantiomer 2a (2A) shows the chiral chromatograph for 2a having a retention time of 2.03 minutes that further validates the enantiomeric integrity.
Figure 2:
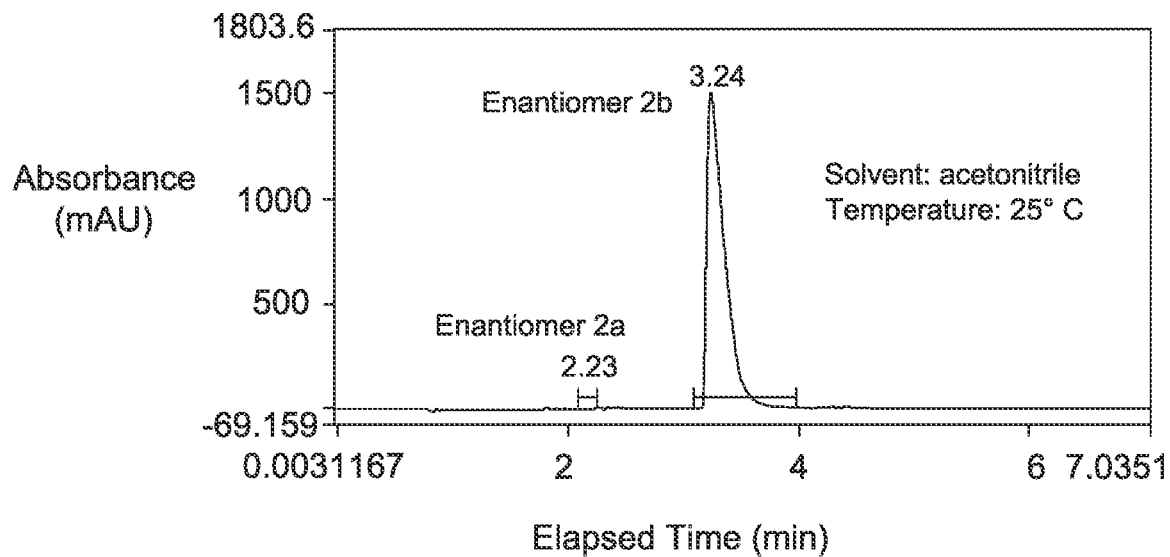
FIG. 2 (Analytical Chiral HPLC SFC Chromatogram of Enantiomer 2b (2B) shows the chiral chromatograph for 2b having a retention time of 3.24 minutes that further validates the enantiomeric integrity.

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a process or method that comprises a list of elements is not necessarily limited to only those elements but may include other elements not expressly listed or inherent to such composition process or method.

The transitional phrase "consisting of" excludes any element, step or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a process or method that includes materials, steps, features, components or elements, in addition to those literally disclosed, provided that these additional materials, steps, features, components or elements do not materially affect the basic and novel characteristic(s) of the disclosure. The term "consisting essentially of" occupies a middle ground between "comprising" and "consisting of".

Where applicants have defined the disclosure or a portion thereof with an open-ended term such as "comprising," it should be readily understood that (unless otherwise stated) the description should be interpreted to also describe such a disclosure using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the disclosure are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

The term "$C_1$-$C_4$ alkyl" includes straight-chain or branched alkyl having one to four carbon atoms, e.g., methyl, ethyl, n-propyl, i-propyl or the different butyl isomers. As used herein, the term "halogen" includes fluorine, chlorine, bromine or iodine. The term "$C_1$-$C_4$ alkylcarbonyl" as used herein refers to a $C_1$-$C_4$ alkyl bonded through a carbonyl. The term "$C_1$-$C_4$ alkoxycarbonyl" refers to a "$C_1$-$C_4$ alkoxy group bonded through a carbonyl. The term "$C_1$-$C_4$ alkylcarboxymethyl" refers to an ($C_1$-$C_4$ alkyl)C=O group bonded through a —$CH_2$— group.

Compounds of Formula 1a and Formula 1b typically can independently exist in different solid forms. Thus, a compound of Formula 1a and Formula 1b includes all crystalline and non-crystalline forms of the compounds they represent. Non-crystalline forms include embodiments which are solids such as waxes and gums as well as embodiments which are liquids such as solutions and melts. Crystalline forms include embodiments which represent essentially a single crystal type and embodiments which represent a mixture of polymorphs (i.e. different crystalline types). The term "polymorph" refers to a particular crystalline form of a chemical compound that can crystallize in different crystalline forms, these forms having different arrangements and/or conformations of the molecules in the crystal lattice. Although polymorphs can have the same chemical composition, they can also differ in composition due to the presence or absence of co-crystallized water or other molecules, which can be weakly or strongly bound in the lattice. Polymorphs can differ in such chemical, physical and biological properties as crystal shape, density, hardness, color, chemical stability, melting point, hygroscopicity, suspensibility, dissolution rate and biological availability.

One skilled in the art will appreciate that a polymorph of a compound of Formula 1a and Formula 1b can exhibit beneficial effects (e.g., suitability for preparation of useful formulations, improved biological performance) relative to another polymorph or a mixture of polymorphs of the same compound of Formula 1a and Formula 1b. Preparation and isolation of a particular polymorph of a compound of Formula 1a and Formula 1b can be achieved by methods known to those skilled in the art including, for example, crystallization using selected solvents and temperatures. For a comprehensive discussion of polymorphism see R. Hilfiker, Ed., *Polymorphism in the Pharmaceutical Industry*, Wiley-VCH, Weinheim, 2006.

Exemplary procedures for preparing N-oxides include the oxidation of heterocycles and tertiary amines with peroxy acids such as peracetic and m-chloroperbenzoic acid (MCPBA), hydrogen peroxide, alkyl hydroperoxides such as t-butyl hydroperoxide, sodium perborate, and dioxiranes such as dimethyldioxirane. These methods for the preparation of N-oxides have been extensively described and reviewed in the literature, see for example: T. L. Gilchrist in *Comprehensive Organic Synthesis*, vol. 7, pp 748-750, S. V. Ley, Ed., Pergamon Press; M. Tisler and B. Stanovnik in *Comprehensive Heterocyclic Chemistry*, vol. 3, pp 18-20, A. J. Boulton and A. McKillop, Eds., Pergamon Press; M. R. Grimmett and B. R. T. Keene in *Advances in Heterocyclic Chemistry*, vol. 43, pp 149-161, A. R. Katritzky, Ed., Academic Press; M. Tisler and B. Stanovnik in *Advances in Heterocyclic Chemistry*, vol. 9, pp 285-291, A. R. Katritzky and A. J. Boulton, Eds., Academic Press; and G. W. H. Cheeseman and E. S. G. Werstiuk in *Advances in Heterocyclic Chemistry*, vol. 22, pp 390-392, A. R. Katritzky and A. J. Boulton, Eds., Academic Press. That said, one skilled in the art will appreciate that not all nitrogen-containing heterocycles can form N-oxides since the nitrogen requires an available lone pair for oxidation to the oxide; one skilled in the art will recognize those nitrogen-containing heterocycles which can form N-oxides.

Compounds of this invention can exist as one or more stereoisomers. The various stereoisomers include enantiomers, diastereomers, atropisomers and geometric isomers. Stereoisomers are isomers of identical constitution but differing in the arrangement of their atoms in space and include enantiomers, diastereomers, cis-trans isomers (also known as geometric isomers) and atropisomers. Atropisomers result from restricted rotation about single bonds where the rotational barrier is high enough to permit isolation of the isomeric species. One skilled in the art will appreciate that one atropisomer may be more active and/or may exhibit beneficial effects when enriched (i.e. in excess) relative to the other atropisomer(s) or when separated from the other atropisomer(s). The compounds of the invention may be present as a mixture of atropisomers, an individual atropisomer or as an optically active form, optionally one atropisomer is in excess of its corresponding enantiomer.

Particularly, compounds of this invention comprise an atropisomer which is more active than the other atropisomer.

Some non-limiting Embodiments of the present disclosure (wherein a compound of Formula 1a and Formula 1b also includes N-oxides or salts thereof):

Embodiment A1. An optically active compound comprising (or consisting of) an atropisomer of a compound of Formula 1a or an N-oxide or salt thereof, which is present in excess of its corresponding enantiomer of Formula 1b or an N-oxide or salt thereof,

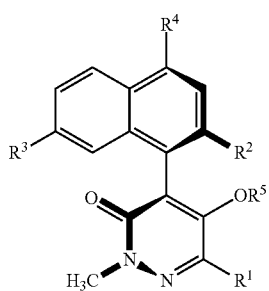

1a

Embodiment A2. The compound of Embodiment A1 wherein $R^1$ is $CH_3$.
Embodiment A3. The compound of Embodiment A1 wherein $R^1$ is a halogen.
Embodiment A4. The compound of Embodiment A3 wherein $R^1$ is Cl, F or Br.
Embodiment A5. The compound of Embodiment A4 wherein $R^1$ is Cl or $CH_3$.
Embodiment A6. The compound of Embodiment A5 wherein $R^1$ is Cl.
Embodiment A7. The compound of any one of Embodiments A1 to A6 wherein $R^2$ is $CH_3$, $CH_2CH_3$, halogen or difluoromethoxy.
Embodiment A8. The compound of Embodiment A7 wherein $R^2$ is $CH_3$, $CH_2CH_3$, Cl or difluoromethoxy.
Embodiment A9. The compound of Embodiment A8 wherein $R^2$ is $CH_3$ or difluoromethoxy.
Embodiment A10. The compound of Embodiment A9 wherein $R^2$ is $CH_3$.
Embodiment A11. The compound of any one of Embodiments A1 through A10 wherein $R^3$ is H or $CH_3$.
Embodiment A12. The compound of Embodiment A11 wherein $R^3$ is H.
Embodiment A13. The compound of Embodiment A12 wherein $R^3$ is $CH_3$.
Embodiment A14. The compound of any of Embodiments A1 through A13 wherein $R^4$ is H, $CH_3$ or Cl.
Embodiment A15. The compound of Embodiment A14 wherein $R^4$ is Cl.
Embodiment A16. The compound of Embodiment A14 wherein $R^4$ is $CH_3$.
Embodiment A17. The compound of Embodiment A14 wherein $R^4$ is H.
Embodiment A18. The compound of any one of Embodiments A1 to A17 wherein $R^5$ is H, $C_3$ alkylcarbonyl, $C_3$ alkoxycarbonyl or $C_3$ alkycarboxymethyl.
Embodiment A19. The compound of Embodiment A18 wherein $R^5$ is H or $C_3$ alkylcarbonyl.
Embodiment A20. The compound of Embodiment A18 wherein $R^5$ is H or —(C=O)$CH_2CH_3$.
Embodiment A21. The compound of Embodiment A20 wherein $R^5$ is H.
Embodiment AA1. An optically active compound consisting of an atropisomer of a compound of Formula 1b or an N-oxide or salt thereof, which is present in excess of its corresponding enantiomer of Formula 1a or an N-oxide or salt thereof,

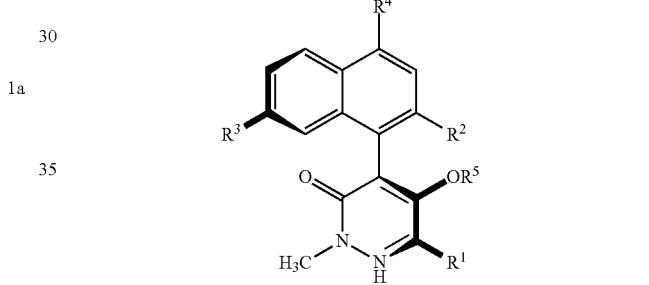

1b

Embodiment AA2. The compound of Embodiment AA1 wherein $R^1$ is $CH_3$.
Embodiment AA3. The compound of Embodiment AA1 wherein $R^1$ is a halogen.
Embodiment AA4. The compound of Embodiment AA3 wherein $R^1$ is Cl, F or Br.
Embodiment AA5. The compound of Embodiment AA4 wherein $R^1$ is Cl or F.
Embodiment AA6. The compound of Embodiment A5 wherein $R^1$ is Cl.
Embodiment AA7. The compound of any one of Embodiments AA1 to AA6 wherein $R^2$ is $CH_3$, $CH_2CH_3$, halogen or difluoromethoxy.
Embodiment AA8. The compound of Embodiment AA7 wherein $R^2$ is $CH_3$, $CH_2CH_3$, Cl or difluoromethoxy.
Embodiment AA9. The compound of Embodiment AA8 wherein $R^2$ is $CH_3$ or difluoromethoxy.
Embodiment AA10. The compound of Embodiment AA9 wherein $R^2$ is $CH_3$.
Embodiment AA11. The compound of any one of Embodiments AA1 through AA10 wherein $R^3$ is H or $CH_3$.
Embodiment AA12. The compound of Embodiment AA11 wherein $R^3$ is H.
Embodiment AA13. The compound of Embodiment AA12 wherein $R^3$ is $CH_3$.

Embodiment AA14. The compound of any of Embodiments AA1 through AA13 wherein $R^4$ is H, $CH_3$ or Cl.
Embodiment AA15. The compound of Embodiment AA14 wherein $R^4$ is Cl.
Embodiment AA16. The compound of Embodiment AA14 wherein $R^4$ is $CH_3$.
Embodiment AA17. The compound of Embodiment AA14 wherein $R^4$ is H.
Embodiment AA18. The compound of any one of Embodiments AA1 to AA17 wherein $R^5$ is H, $C_3$ alkylcarbonyl, $C_3$ alkoxycarbonyl or $C_3$ alkycarboxymethyl.
Embodiment AA19. The compound of Embodiment AA18 wherein $R^5$ is H or $C_3$ alkylcarbonyl.
Embodiment AA20. The compound of Embodiment AA18 wherein $R^5$ is H or $-(C=O)CH_2CH_3$.
Embodiment AA21. The compound of Embodiment AA20 wherein $R^5$ is H.
Embodiment B1. A process as described in the Summary of the Invention for preparing a compound of Formula 1a or 1b.

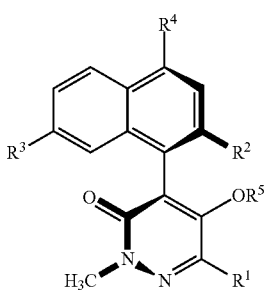

1a

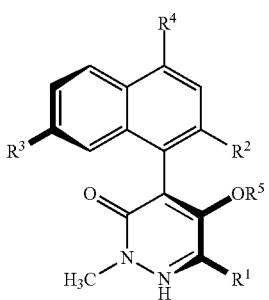

1b

Embodiment B2. The process of Embodiment B1 wherein $R^1$ is $CH_3$.
Embodiment B3. The process of Embodiment B1 wherein $R^1$ is a halogen.
Embodiment B4. The process of Embodiment B3 wherein $R^1$ is Cl, F or Br.
Embodiment B5. The process of Embodiment B4 wherein $R^1$ is Cl or F.
Embodiment B6. The process of Embodiment B5 wherein $R^1$ is Cl.
Embodiment B7. The process of any one of Embodiments B1 to B6 wherein $R^2$ is $CH_3$, $CH_2CH_3$, halogen or difluoromethoxy.
Embodiment B8. The process of Embodiment B7 wherein $R^2$ is $CH_3$, $CH_2CH_3$, Cl or difluoromethoxy.
Embodiment B9. The process of Embodiment B8 wherein $R^2$ is $CH_3$ or difluoromethoxy.
Embodiment B10. The process of Embodiment B9 wherein $R^2$ is $CH_3$.
Embodiment B11. The process of any one of Embodiments B1 through B10 wherein $R^3$ is H or $CH_3$.
Embodiment B12. The process of Embodiment B11 wherein $R^3$ is H.
Embodiment B13. The process of Embodiment B11 wherein $R^3$ is $CH_3$.
Embodiment B14. The process of any of Embodiments B1 through B13 wherein $R^4$ is H, $CH_3$ or Cl.
Embodiment B15. The process of Embodiment B14 wherein $R^4$ is Cl.
Embodiment B16. The process of Embodiment B14 wherein $R^4$ is $CH_3$.
Embodiment B17. The process of Embodiment B14 wherein $R^4$ is H.
Embodiment B18. The process of any one of Embodiments B1 to B17 wherein $R^5$ is H, $C_3$ alkylcarbonyl, $C_3$ alkoxycarbonyl or $C_3$ alkycarboxymethyl.
Embodiment B19. The process of Embodiment B18 wherein $R^5$ is H or $C_3$ alkylcarbonyl.
Embodiment B20. The process of Embodiment B18 wherein $R^5$ is H or $-(C=O)CH_2CH_3$.
Embodiment B21. The process of Embodiment B20 wherein $R^5$ is H.
Embodiment B22. The process of Embodiment B1 wherein the chiral support chromatography is supercritical fluid chromatography (SFC).
Embodiment B23. The process of Embodiment B1 wherein the mobile phase is carbon dioxide.
Embodiment C1. The compound of any one of Embodiments A1 through AA21 wherein the compound is more herbicidally active than its corresponding atropisomer.
Embodiment C2. The compound of Embodiment C1 wherein the compound is more active on grasses than its corresponding atropisomer.

The above embodiments or any embodiment herein can be combined in any manner. This invention also relates to a method for controlling undesired vegetation comprising applying to the locus of the vegetation herbicidally effective amounts of either a compound of Formula 1a or Formula 1b (e.g., as a composition described herein). Of note as embodiments relating to methods of use are those involving the compounds of embodiments described above. Compounds of the invention are particularly useful for selective control of weeds in crops such as wheat, barley, maize, soybean, sunflower, cotton, oilseed rape and rice, and specialty crops such as sugarcane, citrus, fruit and nut crops.

Also noteworthy as embodiments are herbicidal compositions of the present invention comprising the compounds of embodiments described above.

This invention also includes a herbicidal mixture comprising (a) a compound selected from Formula 1a and Formula 1b, N-oxides, and salts thereof, and (b) at least one additional active ingredient selected from (b1) photosystem II inhibitors, (b2) acetohydroxy acid synthase (AHAS) inhibitors, (b3) acetyl-CoA carboxylase (ACCase) inhibitors, (b4) auxin mimics, (b5) 5-enol-pyruvylshikimate-3-phosphate (EPSP) synthase inhibitors, (b6) photosystem I electron diverters, (b7) protoporphyrinogen oxidase (PPO) inhibitors, (b8) glutamine synthetase (GS) inhibitors, (b9) very long chain fatty acid (VLCFA) elongase inhibitors, (b10) auxin transport inhibitors, (b11) phytoene desaturase (PDS) inhibitors, (b12) 4-hydroxyphenyl-pyruvate dioxygenase (HPPD) inhibitors, (b13) homogentisate solanesyltransererase (HST) inhibitors, (b14) cellulose biosynthesis inhibitors, (b15) other herbicides including mitotic disruptors organic arsenicals, asulam, bromobutide, cinmethylin, cumyluron, dazomet, difenzoquat, dymron, etobenzanid, flurenol, fosamine, fosamine-ammonium, hydantocidin, metam, methyldymron, oleic acid, oxaziclomefone, pelargonic acid and pyributicarb, (b16) herbicide safeners, and salts of compounds of (b1) through (b16).

"Photosystem II inhibitors" (b1) are chemical compounds that bind to the D-1 protein at the $Q_B$-binding niche and thus block electron transport from $Q_A$ to $Q_B$ in the chloroplast thylakoid membranes. The electrons blocked from passing through photosystem II are transferred through a series of reactions to form toxic compounds that disrupt cell membranes and cause chloroplast swelling, membrane leakage, and ultimately cellular destruction. The $Q_B$-binding niche has three different binding sites: binding site A binds the triazines such as atrazine, triazinones such as hexazinone, and uracils such as bromacil, binding site B binds the phenylureas such as diuron, and binding site C binds benzothiadiazoles such as bentazon, nitriles such as bromoxynil and phenyl-pyridazines such as pyridate. Examples of photosystem II inhibitors include ametryn, amicarbazone, atrazine, bentazon, bromacil, bromofenoxim, bromoxynil, chlorbromuron, chloridazon, chlorotoluron, chloroxuron, cumyluron, cyanazine, daimuron, desmedipham, desmetryn, dimefuron, dimethametryn, diuron, ethidimuron, fenuron, fluometuron, hexazinone, ioxynil, isoproturon, isouron, lenacil, linuron, metamitron, methabenzthiazuron, metobromuron, metoxuron, metribuzin, monolinuron, neburon, pentanochlor, phenmedipham, prometon, prometryn, propanil, propazine, pyridafol, pyridate, siduron, simazine, simetryn, tebuthiuron, terbacil, terbumeton, terbuthylazine, terbutryn and trietazine.

"AHAS inhibitors" (b2) are chemical compounds that inhibit acetohydroxy acid synthase (AHAS), also known as acetolactate synthase (ALS), and thus kill plants by inhibiting the production of the branched-chain aliphatic amino acids such as valine, leucine and isoleucine, which are required for protein synthesis and cell growth. Examples of AHAS inhibitors include amidosulfuron, azimsulfuron, bensulfuron-methyl, bispyribac-sodium, cloransulam-methyl, chlorimuron-ethyl, chlorsulfuron, cinosulfuron, cyclosulfamuron, diclosulam, ethametsulfuron-methyl, ethoxysulfuron, flazasulfuron, florasulam, flucarbazone-sodium, flumetsulam, flupyrsulfuron-methyl, flupyrsulfuron-sodium, foramsulfuron, halosulfuron-methyl, imazamethabenzmethyl, imazamox, imazapic, imazapyr, imazaquin, imazethapyr, imazosulfuron, iodosulfuron-methyl (including sodium salt), iofensulfuron (2-iodo-N-[[(4-methoxy-6-methyl-1,3,5-triazin-2-yl) amino] carbonyl]-benzenesulfonamide), mesosulfuron-methyl, metazosulfuron (3-chloro-4-(5,6-dihydro-5-methyl-1,4,2-dioxazin-3-yl)-N-[[(4,6-dimethoxy-2-pyrimidinyl)amino]carbonyl]-1-methyl-1H-pyrazole-5-sulfonamide), metosulam, metsulfuron-methyl, nicosulfuron, oxasulfuron, penoxsulam, primisulfuron-methyl, propoxycarbazone-sodium, propyrisulfuron (2-chloro-N-[[(4,6-dimethoxy-2-pyrimidinyl)amino]carbonyl]-6-propylimidazo[1,2-b]pyridazine-3-sulfonamide), prosulfuron, pyrazosulfuron-ethyl, pyribenzoxim, pyriftalid, pyriminobac-methyl, pyrithiobac-sodium, rimsulfuron, sulfometuron-methyl, sulfosulfuron, thiencarbazone, thifensulfuron-methyl, triafamone (N-[2-[(4,6-dimethoxy-1,3,5-triazin-2-yl)carbonyl]-6-fluorophenyl]-1,1-difluoro-N-methylmethanesulfonamide), triasulfuron, tribenuron-methyl, trifloxysulfuron (including sodium salt), triflusulfuron-methyl and tritosulfuron.

"ACCase inhibitors" (b3) are chemical compounds that inhibit the acetyl-CoA carboxylase enzyme, which is responsible for catalyzing an early step in lipid and fatty acid synthesis in plants. Lipids are essential components of cell membranes, and without them, new cells cannot be produced. The inhibition of acetyl CoA carboxylase and the subsequent lack of lipid production leads to losses in cell membrane integrity, especially in regions of active growth such as meristems. Eventually shoot and rhizome growth ceases, and shoot meristems and rhizome buds begin to die back. Examples of ACCase inhibitors include alloxydim, butroxydim, clethodim, clodinafop, cycloxydim, cyhalofop, diclofop, fenoxaprop, fluazifop, haloxyfop, pinoxaden, profoxydim, propaquizafop, quizalofop, sethoxydim, tepraloxydim and tralkoxydim, including resolved forms such as fenoxaprop-P, fluazifop-P, haloxyfop-P and quizalofop-P and ester forms such as clodinafop-propargyl, cyhalofop-butyl, diclofop-methyl and fenoxaprop-P-ethyl.

Auxin is a plant hormone that regulates growth in many plant tissues. "Auxin mimics" (b4) are chemical compounds mimicking the plant growth hormone auxin, thus causing uncontrolled and disorganized growth leading to plant death in susceptible species. Examples of auxin mimics include aminocyclopyrachlor (6-amino-5-chloro-2-cyclopropyl-4-pyrimidinecarboxylic acid) and its methyl and ethyl esters and its sodium and potassium salts, aminopyralid, benazolin-ethyl, chloramben, clacyfos, clomeprop, clopyralid, dicamba, 2,4-D, 2,4-DB, dichlorprop, fluroxypyr, halauxifen (4-amino-3-chloro-6-(4-chloro-2-fluoro-3-methoxyphenyl)-2-pyridinecarboxylic acid), halauxifen-methyl (methyl 4-amino-3-chloro-6-(4-chloro-2-fluoro-3-methoxyphenyl)-2-pyridinecarboxylate), MCPA, MCPB, mecoprop, picloram, quinclorac, quinmerac, 2,3,6-TBA, triclopyr, and methyl 4-amino-3-chloro-6-(4-chloro-2-fluoro-3-methoxyphenyl)-5-fluoro-2-pyridinecarboxylate.

"EPSP synthase inhibitors" (b5) are chemical compounds that inhibit the enzyme, 5-enol-pyruvylshikimate-3-phosphate synthase, which is involved in the synthesis of aromatic amino acids such as tyrosine, tryptophan and phenylalanine. EPSP inhibitor herbicides are readily absorbed through plant foliage and translocated in the phloem to the growing points. Glyphosate is a relatively nonselective postemergence herbicide that belongs to this group. Glyphosate includes esters and salts such as ammonium, isopropylammonium, potassium, sodium (including sesquisodium) and trimesium (alternatively named sulfosate).

"Photosystem I electron diverters" (b6) are chemical compounds that accept electrons from Photosystem I, and after several cycles, generate hydroxyl radicals. These radicals are extremely reactive and readily destroy unsaturated lipids, including membrane fatty acids and chlorophyll. This destroys cell membrane integrity, so that cells and organelles "leak", leading to rapid leaf wilting and desiccation, and eventually to plant death. Examples of this second type of photosynthesis inhibitor include diquat and paraquat.

"PPO inhibitors" (b7) are chemical compounds that inhibit the enzyme protoporphyrinogen oxidase, quickly resulting in formation of highly reactive compounds in plants that rupture cell membranes, causing cell fluids to leak out. Examples of PPO inhibitors include acifluorfen-sodium, azafenidin, benzfendizone, bifenox, butafenacil, carfentrazone, carfentrazone-ethyl, chlomethoxyfen, cinidon-ethyl, fluazolate, flufenpyr-ethyl, flumiclorac-pentyl, flumioxazin, fluoroglycofen-ethyl, fluthiacet-methyl, fomesafen, halosafen, lactofen, oxadiargyl, oxadiazon, oxyfluorfen, pentoxazone, profluazol, pyraclonil, pyraflufen-ethyl, saflufenacil, sulfentrazone, thidiazimin, trifludimoxazin (dihydro-1,5-dimehyl-6-thioxo-3-[2,2,7-trifluoro-3,4-dihydro-3-oxo-4-(2-propyn-1-yl)-2H-1,4-benzoxazin-6-yl]-1,3,5-triazine-2,4(1H,3H)-dione) and tiafenacil (methyl N-[2-[[2- chloro-5-[3,6-dihydro-3-methyl-2,6-dioxo-4-(trifluoromethyl)-1(2H)-pyrimidinyl]-4-fluorophenyl]thio]-1-oxopropyl]-β-alaninate).

"GS inhibitors" (b8) are chemical compounds that inhibit the activity of the glutamine synthetase enzyme, which plants use to convert ammonia into glutamine Consequently, ammonia accumulates and glutamine levels decrease. Plant damage probably occurs due to the combined effects of ammonia toxicity and deficiency of amino acids required for other metabolic processes. The GS inhibitors include glufosinate and its esters and salts such as glufosinate-ammonium and other phosphinothricin derivatives, glufosinate-P ((2S)-2-amino-4-(hydroxymethylphosphinyl)butanoic acid) and bilanaphos.

"VLCFA elongase inhibitors" (b9) are herbicides having a wide variety of chemical structures, which inhibit the elongase. Elongase is one of the enzymes located in or near chloroplasts which are involved in biosynthesis of VLCFAs. In plants, very-long-chain fatty acids are the main constituents of hydrophobic polymers that prevent desiccation at the leaf surface and provide stability to pollen grains. Such herbicides include acetochlor, alachlor, anilofos, butachlor, cafenstrole, dimethachlor, dimethenamid, diphenamid, fenoxasulfone (3-[[2,5-dichloro-4-ethoxyphenyemethyl]sulfonyl]-4,5-dihydro-5,5-dimethylisoxazole), fentrazamide, flufenacet, indanofan, mefenacet, metazachlor, metolachlor, naproanilide, napropamide, napropamide-M ((2R)-N,N-diethyl-2-(1-naphthalenyloxy)propanamide),
pethoxamid, piperophos, pretilachlor, propachlor, propisochlor, pyroxasulfone, and thenylchlor, including resolved forms such as S-metolachlor and chloroacetamides and oxyacetamides.

"Auxin transport inhibitors" (b10) are chemical substances that inhibit auxin transport in plants, such as by binding with an auxin-carrier protein. Examples of auxin transport inhibitors include diflufenzopyr, naptalam (also known as N-(1-naphthyl)phthalamic acid and 2-[(1-naphthalenylamino)carbonyl] benzoic acid).

"PDS inhibitors" (b11) are chemical compounds that inhibit carotenoid biosynthesis pathway at the phytoene desaturase step. Examples of PDS inhibitors include beflubutamid, S-beflubutamid, diflufenican, fluridone, flurochloridone, flurtamone norflurzon and picolinafen.

"HPPD inhibitors" (b12) are chemical substances that inhibit the biosynthesis of synthesis of 4-hydroxyphenyl-pyruvate dioxygenase. Examples of HPPD inhibitors include benzobicyclon, benzofenap, bicyclopyrone (4-hydroxy-3-[[2-[(2-methoxyethoxy)methyl]-6-(trifluoromethyl)-3-pyridinyl]carbonyl]bicyclo[3.2.1]oct-3-en-2-one), fenquinotrione (2-[[8-chloro-3,4-dihydro-4-(4-methoxyphenyl)-3-oxo-2-quinoxalinyl]carbonyl]-1,3-cyclohexanedione), isoxachlortole, isoxaflutole, mesotrione, pyrasulfotole, pyrazolynate, pyrazoxyfen, sulcotrione, tefuryltrione, tembotrione, tolpyralate (1-[[1-ethyl-4-[3-(2-methoxyethoxy)-2-methyl-4-(methylsulfonyl)benzoyl]-1H-pyrazol-5-yl]oxy]ethyl methyl carbonate), topramezone, 5-chloro-3-[(2-hydroxy-6-oxo-1-cyclohexen-1-yl)carbonyl]-1-(4-methoxyphenyl)-2(1H)-quinoxalinone, 4-(2,6-diethyl-4-methylphenyl)-5-hydroxy-2,6-dimethyl-3(2H)-pyridazinone, 4-(4-fluorophenyl)-6-[(2-hydroxy-6-oxo-1-cyclohexen-1-yl)carbonyl]-2-methyl-1,2,4-triazine-3,5 (2H, 4H)-dione, 5-[(2-hydroxy-6-oxo-1-cyclohexen-1-yl)carbonyl]-2-(3-methoxyphenyl)-3-(3-methoxypropyl)-4 (3H)-pyrimidinone, 2-methyl-N-(4-methyl-1,2,5-oxadiazol-3-yl)-3-(methylsulfinyl)-4-(trifluoromethyl)benzamide and 2-methyl-3-(methylsulfonyl)-N-(1-methyl-1H-tetrazol-5-yl)-4-(trifluoromethyl)benzamide.

"HST inhibitors" (b13) disrupt a plant's ability to convert homogentisate to 2-methyl-6-solanyl-1,4-benzoquinone, thereby disrupting carotenoid biosynthesis. Examples of HST inhibitors include cyclopyrimorate (6-chloro-3-(2-cyclopropyl-6-methylphenoxy) pyridazinyl 4-morpholinecarboxylate), haloxydine, pyriclor, 3-(2-chloro-3,6-difluorophenyl)-4-hydroxy-1-methyl-1,5-naphthyridin-2 (1H)-one, 7-(3,5-dichloro-4-pyridinyl)-5-(2,2-difluoroethyl)-8-hydroxypyrido[2,3-b]pyrazin-6(5H)-one and 4-(2,6-diethyl-4-methyl-phenyl)-5-hydroxy-2,6-dimethyl-3(2H)-pyridazinone.

HST inhibitors also include compounds of Formulae A and B.

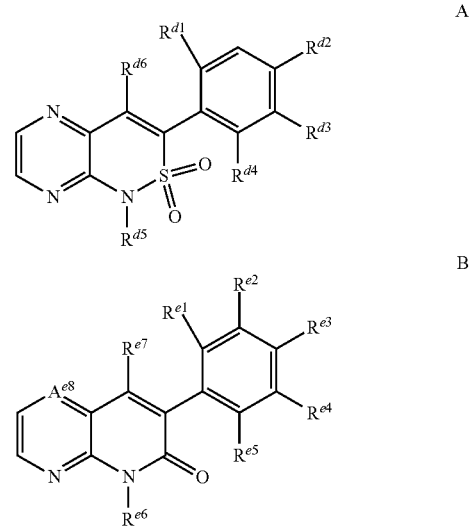

wherein $R^{d1}$ is H, Cl or $CF_3$; $R^{d2}$ is H, Cl or Br; $R^{d3}$ is H or Cl; $R^{d4}$ is H, Cl or $CF_3$; $R^{d5}$ is $CH_3$, $CH_2CH_3$ or $CH_2CHF_2$; and $R^{d6}$ is OH or —OC(=O)-i-Pr; and $R^{e1}$ is H, F, Cl, $CH_3$ or $CH_2CH_3$; $R^{e2}$ is H or $CF_3$; $R^{e3}$ is H, $CH_3$ or $CH_2CH_3$; $R^{e4}$ is H, F or Br; $R^{e5}$ is Cl, $CH_3$, $CF_3$, $OCF_3$ or $CH_2CH_3$; $R^{e6}$ is H, $CH_3$, $CH_2CHF_2$ or C≡CH; $R^{e7}$ is OH, —OC(=O)Et, —OC(=O)-i-Pr or —OC(=O)-t-Bu; and $A^{e8}$ is N or CH.

"Cellulose biosynthesis inhibitors" (b14) inhibit the biosynthesis of cellulose in certain plants. They are most effective when applied preemergence or early postemergence on young or rapidly growing plants. Examples of cellulose biosynthesis inhibitors include chlorthiamid, dichlobenil, flupoxam, indaziflam ($N^2$-[(1R,2S)-2,3-dihydro-2,6-dimethyl-1H-inden-1-yl]-6-(1-fluoroethyl)-1,3,5-triazine-2,4-diamine), isoxaben and triaziflam.

"Other herbicides" (b15) include herbicides that act through a variety of different modes of action such as mitotic disruptors (e.g., flamprop-M-methyl and flamprop-M-isopropyl) organic arsenicals (e.g., DSMA, and MSMA), 7,8-dihydropteroate synthase inhibitors, chloroplast isoprenoid synthesis inhibitors and cell-wall biosynthesis inhibitors. Other herbicides include those herbicides having unknown modes of action or do not fall into a specific category listed in (b1) through (b14) or act through a combination of modes of action listed above. Examples of other herbicides include aclonifen, asulam, amitrole, bromobutide, cinmethylin, clomazone, cumyluron, daimuron, dimesulfazet (CAS No. 1215111-77-5), difenzoquat, epyrifenacil (CAS No. 353292-31-6), etobenzanid, fluometuron, flurenol, fosamine, fosamine-ammonium, dazomet, dymron, ipfencarbazone (1-(2,4-dichlorophenyl)-N-(2,4-difluorophenyl)-1,5-dihydro-N-(1-methylethyl)-5-oxo-4H-1,2,4-triazole carboxamide), metam, methyldymron, oleic acid, oxaziclomefone, pelargonic acid, pyributicarb, tetflupyrolimet and 5-[[(2,6-difluorophenyl)methoxy]methyl]-4,5-dihydro methyl-3-(3-methyl-2-thienyl)isoxazole. "Other herbicides" (b15) also include a compound of Formula (b15A)

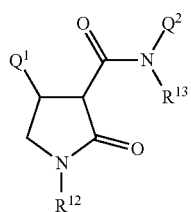

(b15A)

wherein
$R^{12}$ is H, $C_1$-$C_6$ alkyl, $C_1$-$C_6$ haloalkyl or $C_4$-$C_8$ cycloalkyl;
$R^{13}$ is H, $C_1$-$C_6$ alkyl or $C_1$-$C_6$ alkoxy;
$Q^1$ is an optionally substituted ring system selected from the group consisting of phenyl, thienyl, pyridinyl, benzodioxolyl, naphthyl, naphthalenyl, benzofuranyl, furanyl, benzothiophenyl and pyrazolyl, wherein when substituted said ring system is substituted by 1 to 3 $R^{14}$;
$Q^2$ is an optionally substituted ring system selected from the group consisting of phenyl, pyridinyl, benzodioxolyl, pyridinonyl, thiadiazolyl, thiazolyl, and oxazolyl, wherein when substituted said ring system is substituted by 1 to 3 $R^{15}$;
each $R^{14}$ is independently halogen, $C_1$-$C_6$ alkyl, $C_1$-$C_6$ haloalkyl, $C_1$-$C_6$ alkoxy, $C_1$-$C_6$ haloalkoxy, $C_3$-$C_8$ cyaloalkyl, cyano, $C_1$-$C_6$ alkylthio, $C_1$-$C_6$ alkylsulfinyl, $C_1$-$C_6$ alkylsulfonyl, $SF_5$, $NHR^{17}$; or phenyl optionally substituted by 1 to 3 $R^{16}$; or pyrazolyl optionally substituted by 1 to 3 $R^{16}$;
each $R^{15}$ is independently halogen, $C_1$-$C_6$ alkyl, $C_1$-$C_6$ haloalkyl, $C_1$-$C_6$ alkoxy, $C_1$-$C_6$ haloalkoxy, cyano, nitro, $C_1$-$C_6$ alkylthio, $C_1$-$C_6$ alkylsulfinyl, $C_1$-$C_6$ alkylsulfonyl;
each $R^{16}$ is independently halogen, $C_1$-$C_6$ alkyl or $C_1$-$C_6$ haloalkyl;
$R^{17}$ is $C_1$-$C_4$ alkoxycarbonyl.

In one Embodiment wherein "other herbicides" (b15) also include a compound of Formula (b15A), it is preferred that $R^{12}$ is H or $C_1$-$C_6$ alkyl; more preferably $R^{12}$ is H or methyl. Preferrably $R^{13}$ is H. Preferably $Q^1$ is either a phenyl ring or a pyridinyl ring, each ring substituted by 1 to 3 $R^{14}$; more preferably $Q^1$ is a phenyl ring substituted by 1 to 2 $R^{14}$. Preferably $Q^2$ is a phenyl ring substituted by 1 to 3 $R^{15}$; more preferably $Q^2$ is a phenyl ring substituted by 1 to 2 $R^{15}$. Preferably each $R^{14}$ is independently halogen, $C_1$-$C_4$ alkyl, $C_1$-$C_3$ haloalkyl, $C_1$-$C_3$ alkoxy or $C_1$-$C_3$ haloalkoxy; more preferably each $R^{14}$ is independently chloro, fluoro, bromo, $C_1$-$C_2$ haloalkyl, $C_1$-$C_2$ haloalkoxy or $C_1$-$C_2$ alkoxy. Preferrably each $R^{15}$ is independently halogen, $C_1$-$C_4$ alkyl, $C_1$-$C_3$ haloalkoxy; more preferably each $R^{15}$ is independently chloro, fluoro, bromo, $C_1$-$C_2$ haloalkyl, $C_1$-$C_2$ haloalkoxy or $C_1$-$C_2$ alkoxy. Specifically preferred as "other herbicides" (b15) include any one of the following (b15A-1) through (b15A-16):

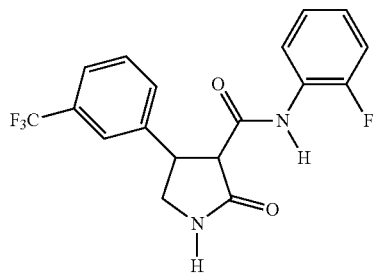

(b15A-1)

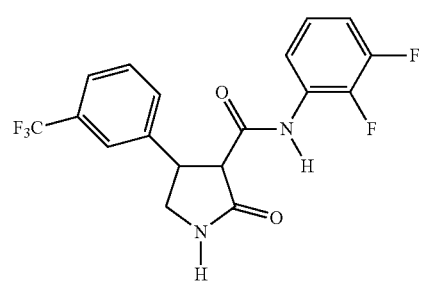

(b15A-2)

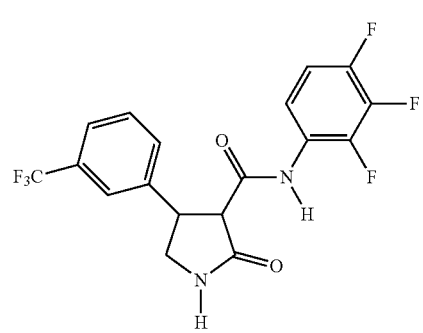

(b15A-3)

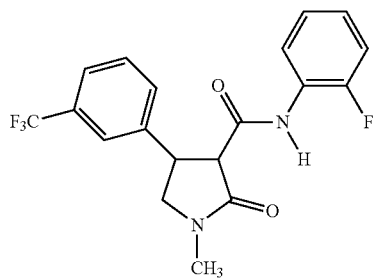

(b15A-4)

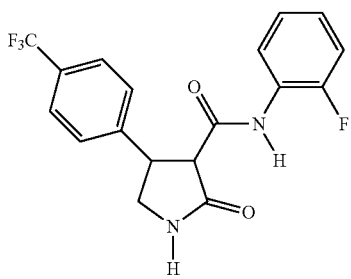

(b15A-5)

(b15A-6)
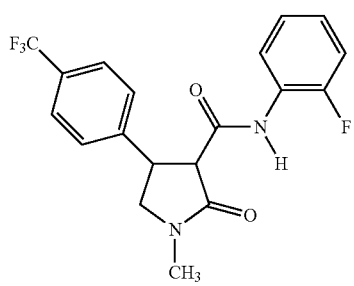
(b15A-7)
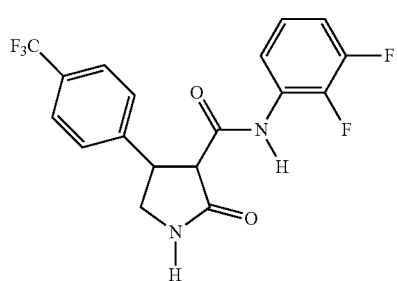
(b15A-8)
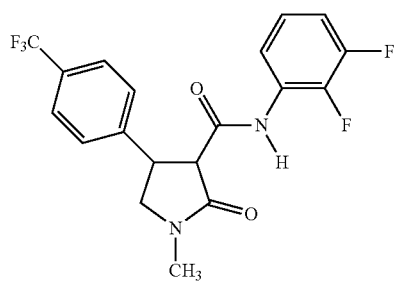
(b15A-9)
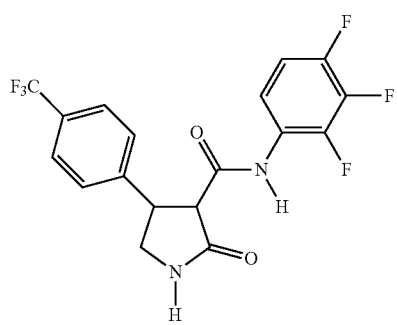
(b15A-10)
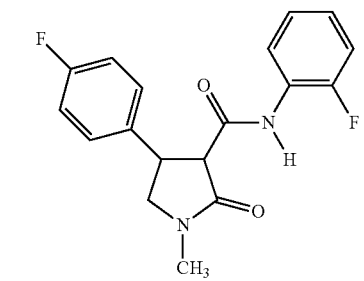
(b15A-11)
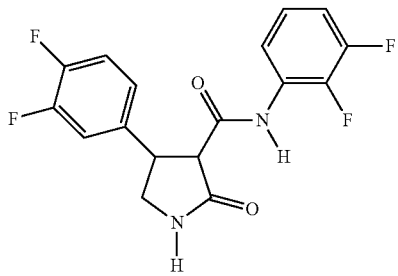
(b15A-12)
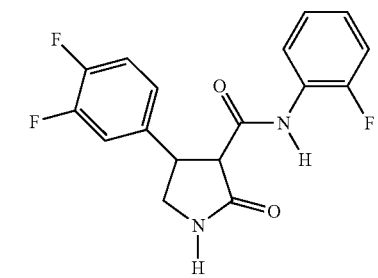
(b15A-13)
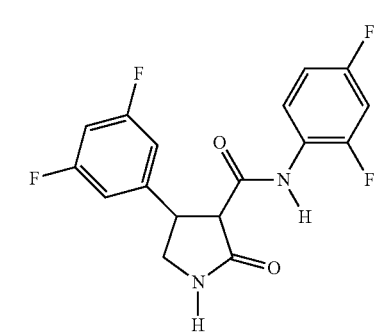
(b15A-14)
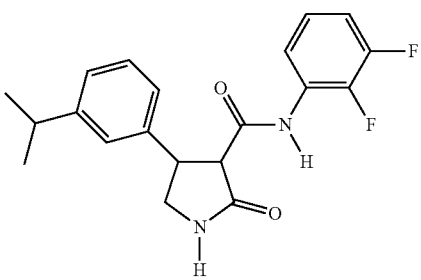
(b15A-15)
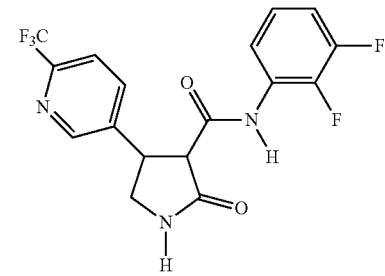

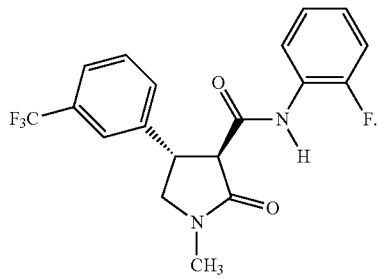
(b15A-16)

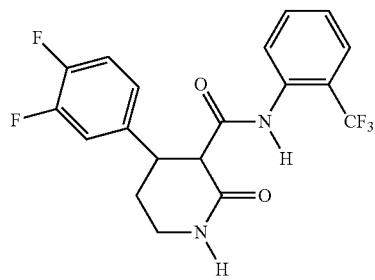
(b15B-1)

"Other herbicides" (b15) also include a compound of Formula (b15B)

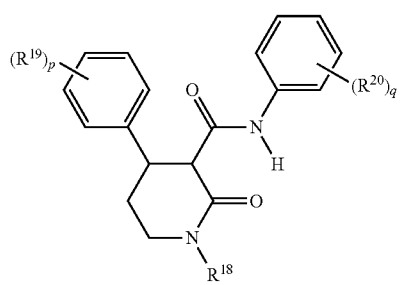
(b15B)

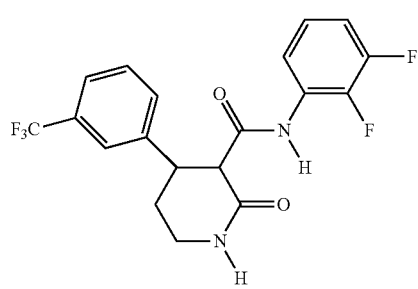
(b15B-2)

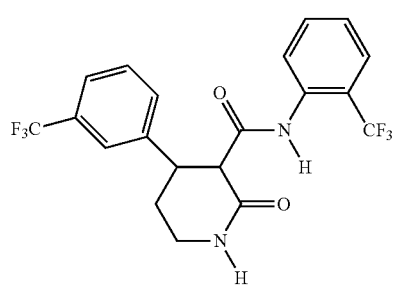
(b15B-3)

wherein $R^{18}$ is H, $C_1$-$C_6$ alkyl, $C_1$-$C_6$ haloalkyl or $C_4$-$C_8$ cycloalkyl;

each $R^{19}$ is independently halogen, $C_1$-$C_6$ haloalkyl or $C_1$-$C_6$ haloalkoxy;

p is an integer of 0, 1, 2 or 3;

each $R^{20}$ is independently halogen, $C_1$-$C_6$ haloalkyl or $C_1$-$C_6$ haloalkoxy; and q is an integer of 0, 1, 2 or 3.

In one Embodiment wherein "other herbicides" (b15) also include a compound of Formula (b15B), it is preferred that $R^{18}$ is H, methyl, ethyl or propyl; more preferably $R^{18}$ is H or methyl; most preferably $R^{18}$ is H. Preferrably each $R^{19}$ is independently chloro, fluoro, $C_1$-$C_3$ haloalkyl or $C_1$-$C_3$ haloalkoxy; more preferably each $R^{19}$ is independently chloro, fluoro, $C_1$ fluoroalkyl (i.e. fluoromethyl, difluoromethyl or trifluoromethyl) or $C_1$ fluoroalkoxy (i.e. trifluoromethoxy, difluoromethoxy or fluoromethoxy). Preferably each $R^{20}$ is independently chloro, fluoro, $C_1$ haloalkyl or $C_1$ haloalkoxy; more preferably each $R^{20}$ is independently chloro, fluoro, $C_1$ fluoroalkyl (i.e. fluoromethyl, difluoromethyl or trifluoromethyl) or $C_1$ fluoroalkoxy (i.e. trifluoromethoxy, difluoromethoxy or fluoromethoxy). Specifically preferred as "other herbicides" (b15) include any one of the following (b15B-1) through (b15B-19):

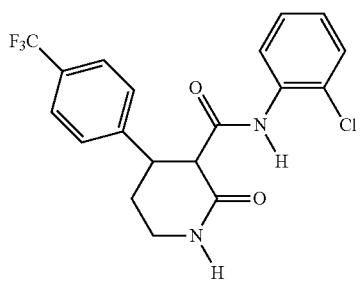
(b15B-4)

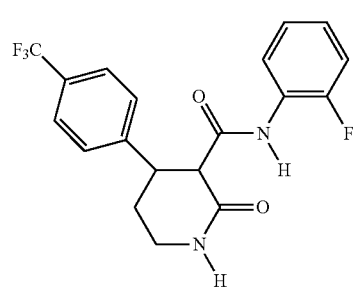
(b15B-5)

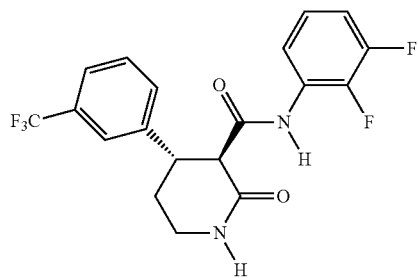
(b15B-6)
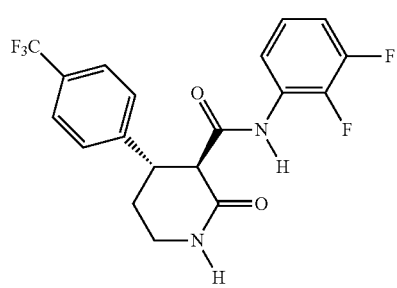
(b15B-7)
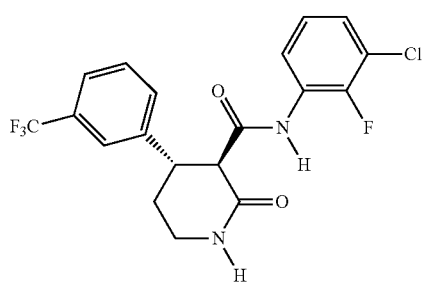
(b15B-8)
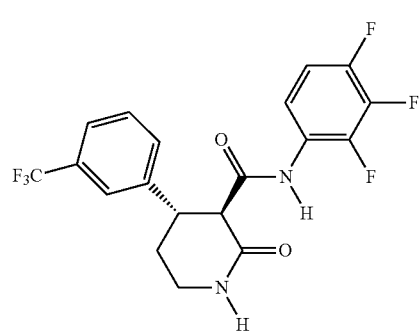
(b15B-9)
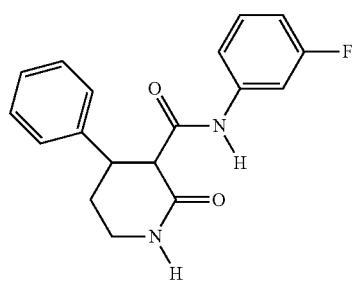
(b15B-10)
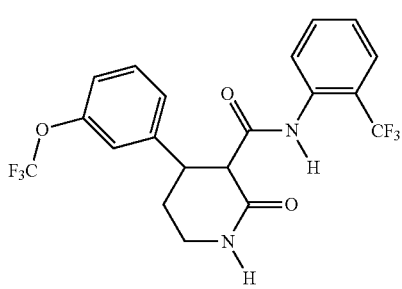
(b15B-11)
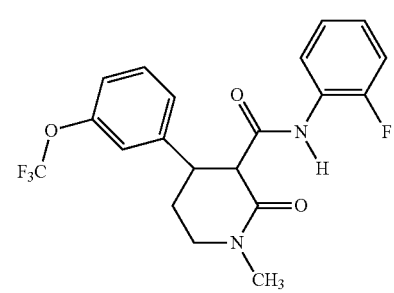
(b15B-12)
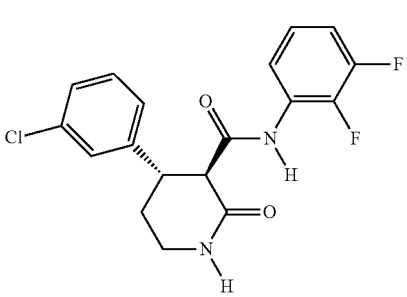
(b15B-13)
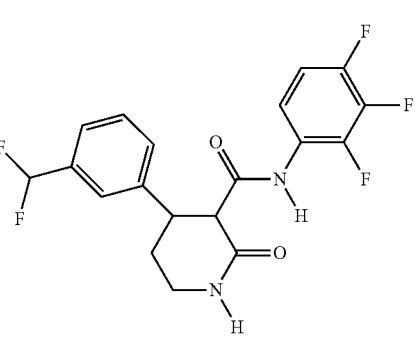
(b15B-14)
(b15B-15)

-continued

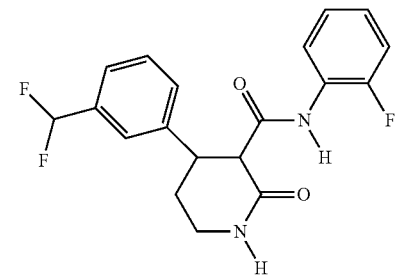
(b15B-16)

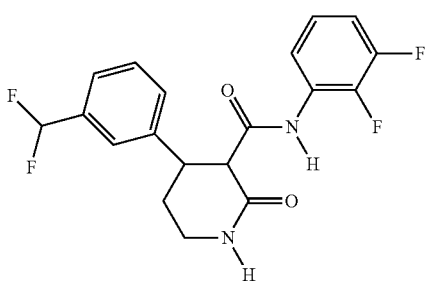
(b15B-17)

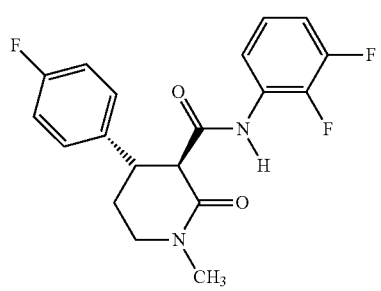
(b15B-18)

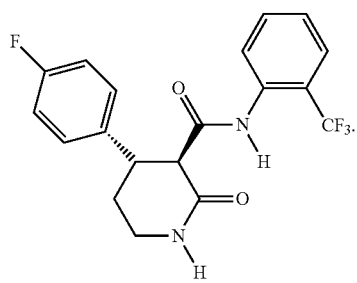
(b15B-19)

Another Embodiment wherein "other herbicides" (b15) also include a compound of Formula (b15C),

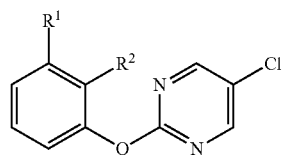
(b15C)

wherein $R^1$ is Cl, Br or CN; and $R^2$ is C(=O)CH$_2$CH$_2$CF$_3$, CH$_2$CH$_2$CH$_2$CH$_2$CF$_3$ or 3-CHF$_2$-isoxazol-5-yl. Specific examples include a compound of Formula (b15C) selected from (b15C1) 5-chloro-2-[3-chloro-2-[3-(difluoromethyl)-5-isoxazolyl]phenoxy]-pyrimidine and (b15C2) 1-[2-chloro-6-[(5-chloro-2-pyrimidinyl)oxy]phenyl]-4,4,4-trifluoro-1-butanone.

"Herbicide safeners" (b16) are substances added to a herbicide formulation to eliminate or reduce phytotoxic effects of the herbicide to certain crops. These compounds protect crops from injury by herbicides but typically do not prevent the herbicide from controlling undesired vegetation. Examples of herbicide safeners include but are not limited to benoxacor, cloquintocet-mexyl, cumyluron, cyometrinil, cyprosulfamide, daimuron, dichlormid, dicyclonon, dietholate, dimepiperate, fenchlorazole-ethyl, fenclorim, flurazole, fluxofenim, furilazole, isoxadifen-ethyl, mefenpyr-diethyl, mephenate, methoxyphenone, naphthalic anhydride, oxabetrinil, N-(aminocarbonyl)-2-methylbenzenesulfonamide and N-(aminocarbonyl)-2-fluorobenzenesulfonamide, 1-bromo-4-[(chloromethyl)sulfonyl]benzene, 2-(dichloromethyl)-2-methyl-1,3-dioxolane (MG 191), 4-(dichloroacetyl)-1-oxa-4-azospiro[4.5]decane (MON 4660), 2,2-dichloro-1-(2,2,5-trimethyl-3-oxazolidinyl)-ethanone and 2-methoxy-N-[[4-[[(methylamino)carbonyl]amino]phenyl]sulfonyl]-benzamide.

Preferred for better control of undesired vegetation (e.g., lower use rate such as from greater-than-additive effects, broader spectrum of weeds controlled or enhanced crop safety) or for preventing the development of resistant weeds are mixtures of a compound of this invention with a herbicide selected from the group consisting of atrazine, azimsulfuron, beflubutamid, S-beflubutamid, benzisothiazolinone, carfentrazone-ethyl, chlorimuron-ethyl, chlorsulfuron-methyl, clomazone, clopyralid potassium, cloransulam-methyl, 2-[(2,4-dichly-6-oxo-1-cyclohexen-1-yl)carbonyl]-2-methyl-1,2,4-triazine-3,5-(2H,4H)-dione, flupyrsulfuron-methyl, fluthiacet-methyl, fomesafen, imazethapyr, lenacil, mesotrione, metribuzin, metsulfuron-methyl, pethoxamid, picloram, pyroxasulfone, quinclorac, rimsulfuron, S-metolachlor, sulfentrazone, thifensulfuron-methyl, triflusulfuron-methyl and tribenuron-methyl.

Substituted Enantiomers of Formula 1a (R) and Formula 1b (S) can be isolated from racemates of Formula 1 by chiral support chromatography (see Scheme-1). Racemates of Formula 1 can be prepared by the methods taught in WO 2015168010. Absolute steroeochemistry can be assigned to a drawn heterobiaryl structure by established nomenclature rules established in the art. One skilled in the art will realize that the two enantiomers that comprise the racemate can also be referred to as atropisomers due to the restricted rotation of the naphthalene and pyridazinone rings of this heterobiaryl ring system. The restriction of rotation locks the two rings into a set stereo-orientation allowing for asymmetry. With substitution on the naphthalene at the position ortho to the bond connected with the pyridazinone, both atropisomers are stable to racemization by ring rotation at temperatures generally below 100° C.

Scheme 1

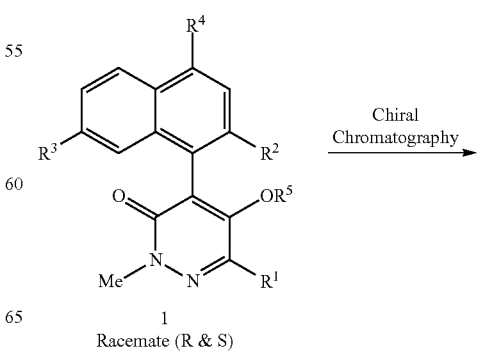

Racemate (R & S)

-continued

Separation Example 1

A 1.8 g sample of racemate 2 was loaded onto a chiral support for supercritical fluid chromatography (SFC) using carbon dioxide as the supercritical fluid mobile phase or with an optional co-solvent such as methanol or actonitrile. Principles used accord similarly to those of standard non-chiral high performance liquid chromatography (HPLC). Two fractions were obtained. The first to elute was labelled enantiomer 2a (580 mg) and second as enenatiomer 2b (600 mg). Optical rotations for 2a and 2b were +47.34 [20° C., c=0.4 (methanol)] and −58.29 [20° C., c=0.4 (methanol)] respectively. The enantiiomeric excess (ee) of both samples was determined by chiral HPLC as being greater than 95%.

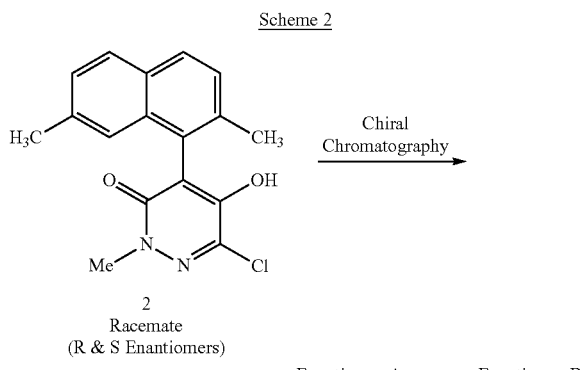

Without further elaboration, it is believed that one skilled in the art using the preceding description can utilize the present disclosure to its fullest extent. The following non-limiting Examples are illustrative of the disclosure.

A compound of Formula 1a and Formula 1b will generally be used as an herbicidal active ingredient in a composition, i.e. formulation, with at least one additional component selected from the group consisting of surfactants, solid diluents and liquid diluents. In certain embodiments, the additional component can serve as a carrier. The formulation or composition ingredients are selected to be consistent with the physical properties of the active ingredient, mode of application and environmental factors such as soil type, moisture and temperature.

Useful formulations include both liquid and solid compositions comprising the compound of Formula 1a and Formula 1b. Liquid compositions include solutions (including emulsifiable concentrates), suspensions, emulsions (including microemulsions, oil-in-water emulsions, flowable concentrates and/or suspoemulsions) and the like, which optionally can be thickened into gels. The general types of aqueous liquid compositions are soluble concentrate, suspension concentrate, capsule suspension, concentrated emulsion, microemulsion, oil-in-water emulsion, flowable concentrate and suspo-emulsion. The general types of non-aqueous liquid compositions are emulsifiable concentrate, microemulsifiable concentrate, dispersible concentrate and oil dispersion.

The general types of solid compositions are dusts, powders, granules, pellets, prills, pastilles, tablets, filled films (including seed coatings) and the like, which can be water-dispersible ("wettable") or water-soluble. Films and coatings formed from film-forming solutions or flowable suspensions are particularly useful for seed treatment. Active ingredient can be (micro)encapsulated and further formed into a suspension or solid formulation; alternatively the entire formulation of active ingredient can be encapsulated (or "overcoated"). Encapsulation can control or delay release of the active ingredient. An emulsifiable granule combines the advantages of both an emulsifiable concentrate formulation and a dry granular formulation. High-strength compositions are primarily used as intermediates for further formulation.

Sprayable formulations are typically extended in a suitable medium before spraying. Such liquid and solid formulations are formulated to be readily diluted in the spray medium, usually water, but occasionally another suitable medium like an aromatic or paraffinic hydrocarbon or vegetable oil. Spray volumes can range from about from about one to several thousand liters per hectare, but more typically are in the range from about ten to several hundred liters per hectare. Sprayable formulations can be tank mixed with water or another suitable medium for foliar treatment by aerial or ground application or for application to the growing medium of the plant. Liquid and dry formulations can be metered directly into drip irrigation systems or metered into the furrow during planting.

The formulations will typically contain effective amounts of active ingredient, diluent and surfactant within the following approximate ranges which add up to 100 percent by weight.

| | Weight Percent | | |
|---|---|---|---|
| | Active Ingredient | Diluent | Surfactant |
| Water-Dispersible and Water-soluble Granules, Tablets and Powders | 0.001-90 | 0-99.999 | 0-15 |
| Oil Dispersions, Suspensions, Emulsions, Solutions (including Emulsifiable Concentrates) | 1-50 | 40-99 | 0-50 |
| Dusts | 1-25 | 70-99 | 0-5 |
| Granules and Pellets | 0.001-99 | 5-99.999 | 0-15 |
| High Strength Compositions | 90-99 | 0-10 | 0-2 |

Solid diluents include, for example, clays such as bentonite, montmorillonite, attapulgite and kaolin, gypsum, cellulose, titanium dioxide, zinc oxide, starch, dextrin, sugars (e.g., lactose, sucrose), silica, talc, mica, diatomaceous earth, urea, calcium carbonate, sodium carbonate and bicarbonate, and sodium sulfate. Typical solid diluents are described in Watkins et al., *Handbook of Insecticide Dust Diluents and Carriers,* 2nd Ed., Dorland Books, Caldwell, New Jersey.

Liquid diluents include, for example, water, N,N-dimethylalkanamides (e.g., N,N-dimethylformamide), limonene, dimethyl sulfoxide, N-alkylpyrrolidones (e.g., N-methylpyrrolidinone), alkyl phosphates (e.g., triethyl phosphate), ethylene glycol, triethylene glycol, propylene glycol, dipropylene glycol, polypropylene glycol, propylene carbonate, butylene carbonate, paraffins (e.g., white mineral oils, normal paraffins, isoparaffins), alkylbenzenes, alkylnaphthalenes, glycerine, glycerol triacetate, sorbitol, aromatic hydrocarbons, dearomatized aliphatics, alkylbenzenes, alkylnaphthalenes, ketones such as cyclohexanone, 2-heptanone, isophorone and 4-hydroxy-4-methyl-2-pentanone, acetates such as isoamyl acetate, hexyl acetate, heptyl acetate, octyl acetate, nonyl acetate, tridecyl acetate and isobornyl acetate, other esters such as alkylated lactate esters, dibasic esters, alkyl and aryl benzoates and γ-butyrolactone, and alcohols, which can be linear, branched, saturated or unsaturated, such as methanol, ethanol, n-propanol, isopropyl alcohol, n-butanol, isobutyl alcohol, n-hexanol, 2-ethylhexanol, n-octanol, decanol, isodecyl alcohol, isooctadecanol, cetyl alcohol, lauryl alcohol, tridecyl alcohol, oleyl alcohol, cyclohexanol, tetrahydrofurfuryl alcohol, diacetone alcohol, cresol and benzyl alcohol. Liquid diluents also include glycerol esters of saturated and unsaturated fatty acids (typically $C_6$-$C_{22}$), such as plant seed and fruit oils (e.g., oils of olive, castor, linseed, sesame, corn (maize), peanut, sunflower, grapeseed, safflower, cottonseed, soybean, rapeseed, coconut and palm kernel), animal-sourced fats (e.g., beef tallow, pork tallow, lard, cod liver oil, fish oil), and mixtures thereof. Liquid diluents also include alkylated fatty acids (e.g., methylated, ethylated, butylated) wherein the fatty acids may be obtained by hydrolysis of glycerol esters from plant and animal sources, and can be purified by distillation. Typical liquid diluents are described in Marsden, *Solvents Guide*, 2nd Ed., Interscience, New York, 1950.

The solid and liquid compositions of the present disclosure often include one or more surfactants. When added to a liquid, surfactants (also known as "surface-active agents") generally modify, most often reduce, the surface tension of the liquid. Depending on the nature of the hydrophilic and lipophilic groups in a surfactant molecule, surfactants can be useful as wetting agents, dispersants, emulsifiers or defoaming agents.

Surfactants can be classified as nonionic, anionic or cationic. Nonionic surfactants useful for the present compositions include, but are not limited to: alcohol alkoxylates such as alcohol alkoxylates based on natural and synthetic alcohols (which may be branched or linear) and prepared from the alcohols and ethylene oxide, propylene oxide, butylene oxide or mixtures thereof; amine ethoxylates, alkanolamides and ethoxylated alkanolamides; alkoxylated triglycerides such as ethoxylated soybean, castor and rapeseed oils; alkylphenol alkoxylates such as octylphenol ethoxylates, nonylphenol ethoxylates, dinonyl phenol ethoxylates and dodecyl phenol ethoxylates (prepared from the phenols and ethylene oxide, propylene oxide, butylene oxide or mixtures thereof); block polymers prepared from ethylene oxide or propylene oxide and reverse block polymers where the terminal blocks are prepared from propylene oxide; ethoxylated fatty acids; ethoxylated fatty esters and oils; ethoxylated methyl esters; ethoxylated tristyrylphenol (including those prepared from ethylene oxide, propylene oxide, butylene oxide or mixtures thereof); fatty acid esters, glycerol esters, lanolin-based derivatives, polyethoxylate esters such as polyethoxylated sorbitan fatty acid esters, polyethoxylated sorbitol fatty acid esters and polyethoxylated glycerol fatty acid esters; other sorbitan derivatives such as sorbitan esters; polymeric surfactants such as random copolymers, block copolymers, alkyd peg (polyethylene glycol) resins, graft or comb polymers and star polymers; polyethylene glycols (pegs); polyethylene glycol fatty acid esters; silicone-based surfactants; and sugar-derivatives such as sucrose esters, alkyl polyglycosides and alkyl polysaccharides.

Useful anionic surfactants include, but are not limited to: alkylaryl sulfonic acids and their salts; carboxylated alcohol or alkylphenol ethoxylates; diphenyl sulfonate derivatives; lignin and lignin derivatives such as lignosulfonates; maleic or succinic acids or their anhydrides; olefin sulfonates; phosphate esters such as phosphate esters of alcohol alkoxylates, phosphate esters of alkylphenol alkoxylates and phosphate esters of styryl phenol ethoxylates; protein-based surfactants; sarcosine derivatives; styryl phenol ether sulfate; sulfates and sulfonates of oils and fatty acids; sulfates and sulfonates of ethoxylated alkylphenols; sulfates of alcohols; sulfates of ethoxylated alcohols; sulfonates of amines and amides such as N,N-alkyltaurates; sulfonates of benzene, cumene, toluene, xylene, and dodecyl and tridecylbenzenes; sulfonates of condensed naphthalenes; sulfonates of naphthalene and alkyl naphthalene; sulfonates of fractionated petroleum; sulfosuccinamates; and sulfosuccinates and their derivatives such as dialkyl sulfosuccinate salts.

Useful cationic surfactants include, but are not limited to: amides and ethoxylated amides; amines such as N-alkyl propanediamines, tripropylenetriamines and dipropylenetetramines, and ethoxylated amines, ethoxylated diamines and propoxylated amines (prepared from the amines and ethylene oxide, propylene oxide, butylene oxide or mixtures thereof); amine salts such as amine acetates and diamine salts; quaternary ammonium salts such as quaternary salts, ethoxylated quaternary salts and diquaternary salts; and amine oxides such as alkyldimethylamine oxides and bis-(2-hydroxyethyl)-alkylamine oxides.

Also useful for the present compositions are mixtures of nonionic and anionic surfactants or mixtures of nonionic and cationic surfactants. Nonionic, anionic and cationic surfactants and their recommended uses are disclosed in a variety of published references including *McCutcheon's Emulsifiers and Detergents*, annual American and International Editions published by McCutcheon's Division, The Manufacturing Confectioner Publishing Co.; Sisely and Wood, *Encyclopedia of Surface Active Agents*, Chemical Publ. Co., Inc., New York, 1964; and A. S. Davidson and B. Milwidsky, *Synthetic Detergents*, Seventh Edition, John Wiley and Sons, New York, 1987.

Compositions of this disclosure may also contain formulation auxiliaries and additives, known to those skilled in the art as formulation aids (some of which may be considered to also function as solid diluents, liquid diluents or surfactants). Such formulation auxiliaries and additives may control: pH (buffers), foaming during processing (antifoams such as polyorganosiloxanes), sedimentation of active ingredients (suspending agents), viscosity (thixotropic thickeners), in-container microbial growth (antimicrobials), product freezing (antifreezes), color (dyes/pigment dispersions), wash-off (film formers or stickers), evaporation (evaporation retardants), and other formulation attributes. Film formers include, for example, polyvinyl acetates, polyvinyl acetate copolymers, polyvinylpyrrolidone-vinyl acetate copolymer, polyvinyl alcohols, polyvinyl alcohol copolymers and waxes. Examples of formulation auxiliaries and additives include those listed in *McCutcheon's Volume 2: Functional Materials*, annual International and North American editions published by McCutcheon's Division, The Manufacturing Confectioner Publishing Co.; and PCT Publication WO 03/024222.

The compound of Formula 1a and Formula 1b and any other active ingredients are typically incorporated into the present compositions by dissolving the active ingredient in a solvent or by grinding in a liquid or dry diluent. Solutions, including emulsifiable concentrates, can be prepared by simply mixing the ingredients. If the solvent of a liquid composition intended for use as an emulsifiable concentrate is water-immiscible, an emulsifier is typically added to emulsify the active-containing solvent upon dilution with water. Active ingredient slurries, with particle diameters of up to 2,000 μm can be wet milled using media mills to obtain particles with average diameters below 3 μm. Aqueous slurries can be made into finished suspension concentrates (see, for example, U.S. Pat. No. 3,060,084) or further processed by spray drying to form water-dispersible granules. Dry formulations usually require dry milling processes, which produce average particle diameters in the 2 to 10 μm range. Dusts and powders can be prepared by blending and usually grinding (such as with a hammer mill or fluid-energy mill). Granules and pellets can be prepared by spraying the active material upon preformed granular carriers or by agglomeration techniques. See Browning, "Agglomeration", *Chemical Engineering*, Dec. 4, 1967, pp 147-48, *Perry's Chemical Engineer's Handbook*, 4th Ed., McGraw-Hill, New York, 1963, pages 8-57 and following, and WO 91/13546. Pellets can be prepared as described in U.S. Pat. No. 4,172,714. Water-dispersible and water-soluble granules can be prepared as taught in U.S. Pat. Nos. 4,144,050, 3,920,442 and DE 3,246,493. Tablets can be prepared as taught in U.S. Pat. Nos. 5,180,587, 5,232,701 and 5,208,030. Films can be prepared as taught in GB 2,095,558 and U.S. Pat. No. 3,299,566.

For further information regarding the art of formulation, see T. S. Woods, "The Formulator's Toolbox—Product Forms for Modern Agriculture" in *Pesticide Chemistry and Bioscience, The Food—Environment Challenge*, T. Brooks and T. R. Roberts, Eds., Proceedings of the 9th International Congress on Pesticide Chemistry, The Royal Society of Chemistry, Cambridge, 1999, pp. 120-133. See also U.S. Pat. No. 3,235,361, Col. 6, line 16 through Col. 7, line 19 and Examples 10-41; U.S. Pat. No. 3,309,192, Col. 5, line 43 through Col. 7, line 62 and Examples 8, 12, 15, 39, 41, 52, 53, 58, 132, 138-140, 162-164, 166, 167 and 169-182; U.S. Pat. No. 2,891,855, Col. 3, line 66 through Col. 5, line 17 and Examples 1-4; Klingman, *Weed Control as a Science*, John Wiley and Sons, Inc., New York, 1961, pp 81-96; Hance et al., *Weed Control Handbook*, 8th Ed., Blackwell Scientific Publications, Oxford, 1989; and *Developments in formulation technology*, PJB Publications, Richmond, U K, 2000.

In the following Examples, all percentages are by weight and all formulations are prepared in conventional ways. The compound number, i.e. "Cpd. No." refers to the compounds in Table 1. Without further elaboration, it is believed that one skilled in the art using the preceding description can utilize the present disclosure to its fullest extent. The following Examples are, therefore, to be construed as merely illustrative, and not limiting of the disclosure in any way whatsoever. Percentages are by weight except where otherwise indicated.

Example A

High Strength Concentrate

| | |
|---|---|
| Compound of Formula 1a or Formula 1b | 98.5% |
| silica aerogel | 0.5% |
| synthetic amorphous fine silica | 1.0% |

Example B

Wettable Powder

| | |
|---|---|
| Compound of Formula 1a or Formula 1b | 65.0% |
| dodecylphenol polyethylene glycol ether | 2.0% |
| sodium ligninsulfonate | 4.0% |
| sodium silicoaluminate | 6.0% |
| montmorillonite (calcined) | 23.0% |

Example C

Granule

| | |
|---|---|
| Compound of Formula 1a or Formula 1b | 10.0% |
| attapulgite granules (low volatile matter, 0.71/0.30 mm; U.S.S. No. 25-50 sieves) | 90.0% |

Example D

Extruded Pellet

| | |
|---|---|
| Compound of Formula 1a or Formula 1b | 25.0% |
| anhydrous sodium sulfate | 10.0% |
| crude calcium ligninsulfonate | 5.0% |
| sodium alkylnaphthalenesulfonate | 1.0% |
| calcium/magnesium bentonite | 59.0% |

Example E

Emulsifiable Concentrate

| | |
|---|---|
| Compound of Formula 1a or Formula 1b | 10.0% |
| polyoxyethylene sorbitol hexoleate | 20.0% |
| $C_6$-$C_{10}$ fatty acid methyl ester | 70.0% |

Example F

Microemulsion

| | |
|---|---|
| Compound of Formula 1a or Formula 1b | 5.0% |
| polyvinylpyrrolidone-vinyl acetate copolymer | 30.0% |
| alkylpolyglycoside | 30.0% |
| glyceryl monooleate | 15.0% |
| water | 20.0% |

Example G

Suspension Concentrate

| | |
|---|---|
| Compound of Formula 1a or Formula 1b | 35% |
| butyl polyoxyethylene/polypropylene block copolymer | 4.0% |
| stearic acid/polyethylene glycol copolymer | 1.0% |
| styrene acrylic polymer | 1.0% |
| xanthan gum | 0.1% |
| propylene glycol | 5.0% |

Example H

Emulsion in Water

| Compound of Formula 1a or Formula 1b | 10.0% |
|---|---|
| butyl polyoxyethylene/polypropylene block copolymer | 4.0% |
| stearic acid/polyethylene glycol copolymer | 1.0% |
| styrene acrylic polymer | 1.0% |
| xanthan gum | 0.1% |
| propylene glycol | 5.0% |
| silicone based defoamer | 0.1% |
| 1,2-benzisothiazolin-3-one | 0.1% |
| aromatic petroleum based hydrocarbon | 20.0 |
| water | 58.7% |

Example I

Oil Dispersion

| Compound of Formula 1a or Formula 1b | 25% |
|---|---|
| polyoxyethylene sorbitol hexaoleate | 15% |
| organically modified bentonite clay | 2.5% |
| fatty acid methyl ester | 57.5% |

Also disclosed are the above Examples A through I, wherein "Compound of Formula 1a or Formula 1b" is replaced with "Compound of Formula 2 (Enantiomer 2A) or Formula 2 (Enantiomer 2B)", Compound of Formula 3 (Enantiomer 3A) or Formula 3 (Enantiomer 3B), "Compound of Formula 4 (Enantiomer 4A) or Formula 4 (Enantiomer 4B)" or "Compound of Formula 5 (Enantiomer 5A) or Formula 5 (Enantiomer 5B)"

Test results indicate that the certain compounds of Formula 1a or Formula 1b are active preemergent and/or postemergent herbicides and/or plant growth regulants. Compounds of Formula 1a or Formula 1b generally show highest activity for postemergence weed control (i.e. applied after weed seedlings emerge from the soil) and preemergence weed control (i.e. applied before weed seedlings emerge from the soil). Many of them have utility for broad-spectrum pre- and/or postemergence weed control in areas where complete control of all vegetation is desired such as around fuel storage tanks, industrial storage areas, parking lots, drive-in theaters, air fields, river banks, irrigation and other waterways, around billboards and highway and railroad structures. Many of the compounds of this disclosure, by virtue of selective metabolism in crops versus weeds or by selective activity at the locus of physiological inhibition in crops and weeds or by selective placement on or within the environment of a mixture of crops and weeds, are useful for the selective control of grass and broadleaf weeds within a crop/weed mixture. One skilled in the art will recognize that the preferred combination of these selectivity factors within a compound or group of compounds can readily be determined by performing routine biological and/or biochemical assays.

Compounds of Formula 1a or Formula 1b may show tolerance to important agronomic crops including, but is not limited to, alfalfa, barley, cotton, wheat, rape, sugar beets, corn (maize), sorghum, soybeans, rice, oats, peanuts, vegetables, tomato, potato, perennial plantation crops including coffee, cocoa, oil palm, rubber, sugarcane, citrus, grapes, fruit trees, nut trees, banana, plantain, pineapple, hops, tea and forests such as *eucalyptus* and conifers (e.g., loblolly pine), and turf species (e.g., Kentucky bluegrass, St. Augustine grass, Kentucky fescue and Bermuda grass). Compounds of this disclosure can be used in or on crops genetically transformed or bred to incorporate resistance to herbicides, express proteins toxic to invertebrate pests (such as *Bacillus thuringiensis* toxin), and/or express other useful traits. Those skilled in the art will appreciate that not all compounds are equally effective against all weeds. Alternatively, the subject compounds are useful to modify plant growth.

As the compounds of the disclosure have (both preemergent and postemergent herbicidal) activity, to control undesired vegetation by killing or injuring the vegetation or reducing its growth, the compounds can be usefully applied by a variety of methods involving contacting an herbicidally effective amount of a compound of the disclosure or a composition comprising said compound and at least one of a surfactant, a solid diluent or a liquid diluent, to the foliage or other part of the undesired vegetation or to the environment of the undesired vegetation such as the soil or water in which the undesired vegetation is growing or which surrounds the seed or other propagule of the undesired vegetation.

A herbicidally effective amount of a compound of Formula 1a or Formula 1b is determined by a number of factors. These factors include: formulation selected, method of application, amount and type of vegetation present, growing conditions, etc. In general, a herbicidally effective amount of compounds of this disclosure is about 0.001 to 20 kg/ha with a preferred range of about 0.004 to 1 kg/ha. One skilled in the art can easily determine the herbicidally effective amount necessary for the desired level of weed control.

In one common embodiment, a compound of Formula 1a or Formula 1b is applied, typically in a formulated composition, to a locus comprising desired vegetation (e.g., crops) and undesired vegetation (i.e. weeds), both of which may be seeds, seedlings and/or larger plants, in contact with a growth medium (e.g., soil). In this locus, a composition comprising a compound of the disclosure can be directly applied to a plant or a part thereof, particularly of the undesired vegetation, and/or to the growth medium in contact with the plant.

Plant varieties and cultivars of the desired vegetation in the locus treated with a compound of the disclosure can be obtained by conventional propagation and breeding methods or by genetic engineering methods. Genetically modified plants (transgenic plants) are those in which a heterologous gene (transgene) has been stably integrated into the plant's genome. A transgene that is defined by its particular location in the plant genome is called a transformation or transgenic event.

Although most typically, compounds of the disclosure are used to control undesired vegetation, contact of desired vegetation in the treated locus with compounds of the disclosure may result in super-additive or synergistic effects with genetic traits in the desired vegetation, including traits incorporated through genetic modification. For example, resistance to phytophagous insect pests or plant diseases, tolerance to biotic/abiotic stresses or storage stability may be greater than expected from the genetic traits in the desired vegetation.

Compounds of this disclosure can also be mixed with one or more other biologically active compounds or agents including herbicides, herbicide safeners, fungicides, insecticides, nematocides, bactericides, acaricides, growth regulators such as insect molting inhibitors and rooting stimulants, chemosterilants, semiochemicals, repellents, attractants, pheromones, feeding stimulants, plant nutrients, other biologically active compounds or entomopathogenic bacteria, virus or fungi to form a multi-component pesticide giving an even broader spectrum of agricultural protection. Mixtures of the compounds of the disclosure with other herbicides can broaden the spectrum of activity against additional weed species, and suppress the proliferation of any resistant biotypes. Thus, the present disclosure also pertains to a composition comprising a compound of Formula 1a and/or Formula 1b (in a herbicidally effective amount) and at least one additional biologically active compound or agent (in a biologically effective amount) and can further comprise at least one of a surfactant, a solid diluent or a liquid diluent. The other biologically active compounds or agents can be formulated in compositions comprising at least one of a surfactant, solid or liquid diluent. For mixtures of the present disclosure, one or more other biologically active compounds or agents can be formulated together with a compound of Formula 1a or Formula 1b, to form a premix or one or more other biologically active compounds or agents can be formulated separately from the compound of Formula 1a or Formula 1b, and the formulations combined together before application (e.g., in a spray tank) or, alternatively, applied in succession.

General references for agricultural protectants (i.e. herbicides, herbicide safeners, insecticides, fungicides, nematocides, acaricides and biological agents) include *The Pesticide Manual*, 13th *Edition*, C. D. S. Tomlin, Ed., British Crop Protection Council, Farnham, Surrey, U.K., 2003 and *The BioPesticide Manual*, 2nd *Edition*, L. G. Copping, Ed., British Crop Protection Council, Farnham, Surrey, U. K., 2001.

For embodiments where one or more of these various mixing partners are used, the mixing partners are typically used in the amounts similar to amounts customary when the mixture partners are used alone. More particularly in mixtures, active ingredients are often applied at an application rate between one-half and the full application rate specified on product labels for use of active ingredient alone. These amounts are listed in references such as *The Pesticide Manual and The BioPesticide Manual*. The weight ratio of these various mixing partners (in total) to the compound of Formula 1a or Formula 1b is typically between about 1:3000 and about 3000:1. Of note are weight ratios between about 1:300 and about 300:1 (for example ratios between about 1:30 and about 30:1). One skilled in the art can easily determine through simple experimentation the biologically effective amounts of active ingredients necessary for the desired spectrum of biological activity. It will be evident that including these additional components may expand the spectrum of weeds controlled beyond the spectrum controlled by the compound of Formula 1a or Formula 1b alone.

Of note is a composition comprising a compound of the invention (in a herbicidally effective amount), at least one additional active ingredient selected from the group consisting of other herbicides and herbicide safeners (in an effective amount), and at least one component selected from the group consisting of surfactants, solid diluents and liquid diluents.

Table A1 lists specific combinations of a Component (a) with Component (b) illustrative of the mixtures, compositions and methods of the present invention. Compound No. A (i.e. "Cpd. No.") stands for "Compound Number") in the Component (a) column is identified in the Index Table. The second column of Table A1 lists the specific Component (b) compound (e.g., "2,4-D" in the first line). The third, fourth and fifth columns of Table A1 lists ranges of weight ratios for rates at which the Component (a) compound is typically applied to a field-grown crop relative to Component (b) (i.e. (a):(b)). Thus, for example, the first line of Table A1 specifically discloses the combination of Component (a) (i.e. Compound No. A in Index Table) with 2,4-D is typically applied in a weight ratio between 1:192-6:1. The remaining lines of Table A1 are to be construed similarly.

TABLE A1

| Component (a) (Compound No.) | Component (b) | Typical Weight Ratio | More Typical Weight Ratio | Most Typical Weight Ratio |
| --- | --- | --- | --- | --- |
| 2 (Enantiomer A) | 2,4-D | 1:192-6:1 | 1:64-2:1 | 1:24-1:3 |
| 2 (Enantiomer A) | Acetochlor | 1:768-2:1 | 1:256-1:2 | 1:96-1:11 |
| 2 (Enantiomer A) | Acifluorfen | 1:96-12:1 | 1:32-4:1 | 1:12-1:2 |
| 2 (Enantiomer A) | Aclonifen | 1:857-2:1 | 1:285-1:3 | 1:107-1:12 |
| 2 (Enantiomer A) | Alachlor | 1:768-2:1 | 1:256-1:2 | 1:96-1:11 |
| 2 (Enantiomer A) | Ametryn | 1:384-3:1 | 1:128-1:1 | 1:48-1:6 |
| 2 (Enantiomer A) | Amicarbazone | 1:192-6:1 | 1:64-2:1 | 1:24-1:3 |
| 2 (Enantiomer A) | Amidosulfuron | 1:6-168:1 | 1:2-56:1 | 1:1-11:1 |
| 2 (Enantiomer A) | Aminocyclopyrachlor | 1:48-24:1 | 1:16-8:1 | 1:6-2:1 |
| 2 (Enantiomer A) | Aminopyralid | 1:20-56:1 | 1:6-19:1 | 1:2-4:1 |
| 2 (Enantiomer A) | Amitrole | 1:768-2:1 | 1:256-1:2 | 1:96-1:11 |
| 2 (Enantiomer A) | Anilofos | 1:96-12:1 | 1:32-4:1 | 1:12-1:2 |
| 2 (Enantiomer A) | Asulam | 1:960-2:1 | 1:320-1:3 | 1:120-1:14 |
| 2 (Enantiomer A) | Atrazine | 1:192-6:1 | 1:64-2:1 | 1:24-1:3 |
| 2 (Enantiomer A) | Azimsulfuron | 1:6-168:1 | 1:2-56:1 | 1:1-11:1 |
| 2 (Enantiomer A) | Beflubutamid | 1:342-4:1 | 1:114-2:1 | 1:42-1:5 |
| 2 (Enantiomer A) | S-Beflubutamid | 1:171-4:0.5 | 1:62-2:0.5 | 1:21-1: |
| 2 (Enantiomer A) | Benfuresate | 1:617-2:1 | 1:205-1:2 | 1:77-1:9 |
| 2 (Enantiomer A) | Bensulfuron-methyl | 1:25-45:1 | 1:8-15:1 | 1:3-3:1 |
| 2 (Enantiomer A) | Bentazone | 1:192-6:1 | 1:64-2:1 | 1:24-1:3 |
| 2 (Enantiomer A) | Benzobicyclon | 1:85-14:1 | 1:28-5:1 | 1:10-1:2 |
| 2 (Enantiomer A) | Benzofenap | 1:257-5:1 | 1:85-2:1 | 1:32-1:4 |
| 2 (Enantiomer A) | Bicyclopyrone | 1:42-27:1 | 1:14-9:1 | 1:5-2:1 |
| 2 (Enantiomer A) | Bifenox | 1:257-5:1 | 1:85-2:1 | 1:32-1:4 |
| 2 (Enantiomer A) | Bispyribac-sodium | 1:10-112:1 | 1:3-38:1 | 1:1-7:1 |
| 2 (Enantiomer A) | Bixlozone | 1:384-3:1 | 1:128-1:1 | 1:48-1:6 |

TABLE A1-continued

| Component (a) (Compound No.) | Component (b) | Typical Weight Ratio | More Typical Weight Ratio | Most Typical Weight Ratio |
|---|---|---|---|---|
| 2 (Enantiomer A) | Bromacil | 1:384-3:1 | 1:128-1:1 | 1:48-1:6 |
| 2 (Enantiomer A) | Bromobutide | 1:384-3:1 | 1:128-1:1 | 1:48-1:6 |
| 2 (Enantiomer A) | Bromoxynil | 1:96-12:1 | 1:32-4:1 | 1:12-1:2 |
| 2 (Enantiomer A) | Butachlor | 1:768-2:1 | 1:256-1:2 | 1:96-1:11 |
| 2 (Enantiomer A) | Butafenacil | 1:42-27:1 | 1:14-9:1 | 1:5-2:1 |
| 2 (Enantiomer A) | Butylate | 1:1542-1:2 | 1:514-1:5 | 1:192-1:22 |
| 2 (Enantiomer A) | Carfenstrole | 1:192-6:1 | 1:64-2:1 | 1:24-1:3 |
| 2 (Enantiomer A) | Carfentrazone-ethyl | 1:128-9:1 | 1:42-3:1 | 1:16-1:2 |
| 2 (Enantiomer A) | Chlorimuron-ethyl | 1:8-135:1 | 1:2-45:1 | 1:1-9:1 |
| 2 (Enantiomer A) | Chlorotoluron | 1:768-2:1 | 1:256-1:2 | 1:96-1:11 |
| 2 (Enantiomer A) | Chlorsulfuron | 1:6-168:1 | 1:2-56:1 | 1:1-11:1 |
| 2 (Enantiomer A) | Cincosulfuron | 1:17-68:1 | 1:5-23:1 | 1:2-5:1 |
| 2 (Enantiomer A) | Cinidon-ethyl | 1:384-3:1 | 1:128-1:1 | 1:48-1:6 |
| 2 (Enantiomer A) | Cinmethylin | 1:34-34:1 | 1:11-12:1 | 1:4-3:1 |
| 2 (Enantiomer A) | Clacyfos | 1:34-34:1 | 1:11-12:1 | 1:4-3:1 |
| 2 (Enantiomer A) | Clethodim | 1:48-24:1 | 1:16-8:1 | 1:6-2:1 |
| 2 (Enantiomer A) | Clodinafop-propargyl | 1:20-56:1 | 1:6-19:1 | 1:2-4:1 |
| 2 (Enantiomer A) | Clomazone | 1:384-3:1 | 1:128-1:1 | 1:48-1:6 |
| 2 (Enantiomer A) | Clomeprop | 1:171-7:1 | 1:57-3:1 | 1:21-1:3 |
| 2 (Enantiomer A) | Clopyralid | 1:192-6:1 | 1:64-2:1 | 1:24-1:3 |
| 2 (Enantiomer A) | Cloransulam-methyl | 1:12-96:1 | 1:4-32:1 | 1:1-6:1 |
| 2 (Enantiomer A) | Cumyluron | 1:384-3:1 | 1:128-1:1 | 1:48-1:6 |
| 2 (Enantiomer A) | Cyanazine | 1:384-3:1 | 1:128-1:1 | 1:48-1:6 |
| 2 (Enantiomer A) | Cyclopyrimorate | 1:17-68:1 | 1:5-23:1 | 1:2-5:1 |
| 2 (Enantiomer A) | Cyclosulfamuron | 1:17-68:1 | 1:5-23:1 | 1:2-5:1 |
| 2 (Enantiomer A) | Cycloxydim | 1:96-12:1 | 1:32-4:1 | 1:12-1:2 |
| 2 (Enantiomer A) | Cyhalofop | 1:25-45:1 | 1:8-15:1 | 1:3-3:1 |
| 2 (Enantiomer A) | Daimuron | 1:192-6:1 | 1:64-2:1 | 1:24-1:3 |
| 2 (Enantiomer A) | Desmedipham | 1:322-4:1 | 1:107-2:1 | 1:40-1:5 |
| 2 (Enantiomer A) | Dicamba | 1:192-6:1 | 1:64-2:1 | 1:24-1:3 |
| 2 (Enantiomer A) | Dichlobenil | 1:1371-1:2 | 1:457-1:4 | 1:171-1:20 |
| 2 (Enantiomer A) | Dichlorprop | 1:925-2:1 | 1:308-1:3 | 1:115-1:13 |
| 2 (Enantiomer A) | Diclofop-methyl | 1:384-3:1 | 1:128-1:1 | 1:48-1:6 |
| 2 (Enantiomer A) | Diclosulam | 1:10-112:1 | 1:3-38:1 | 1:1-7:1 |
| 2 (Enantiomer A) | Difenzoquat | 1:288-4:1 | 1:96-2:1 | 1:36-1:4 |
| 2 (Enantiomer A) | Diflufenican | 1:857-2:1 | 1:285-1:3 | 1:107-1:12 |
| 2 (Enantiomer A) | Diflufenzopyr | 1:12-96:1 | 1:4-32:1 | 1:1-6:1 |
| 2 (Enantiomer A) | Dimethachlor | 1:768-2:1 | 1:256-1:2 | 1:96-1:11 |
| 2 (Enantiomer A) | Dimethametryn | 1:192-6:1 | 1:64-2:1 | 1:24-1:3 |
| 2 (Enantiomer A) | Dimethenamid-P | 1:384-3:1 | 1:128-1:1 | 1:48-1:6 |
| 2 (Enantiomer A) | Dithiopyr | 1:192-6:1 | 1:64-2:1 | 1:24-1:3 |
| 2 (Enantiomer A) | Diuron | 1:384-3:1 | 1:128-1:1 | 1:48-1:6 |
| 2 (Enantiomer A) | EPTC | 1:768-2:1 | 1:256-1:2 | 1:96-1:11 |
| 2 (Enantiomer A) | Esprocarb | 1:1371-1:2 | 1:457-1:4 | 1:171-1:20 |
| 2 (Enantiomer A) | Ethalfluralin | 1:384-3:1 | 1:128-1:1 | 1:48-1:6 |
| 2 (Enantiomer A) | Ethametsulfuron-methyl | 1:17-68:1 | 1:5-23:1 | 1:2-5:1 |
| 2 (Enantiomer A) | Ethoxyfen | 1:8-135:1 | 1:2-45:1 | 1:1-9:1 |
| 2 (Enantiomer A) | Ethoxysulfuron | 1:20-56:1 | 1:6-19:1 | 1:2-4:1 |
| 2 (Enantiomer A) | Etobenzanid | 1:257-5:1 | 1:85-2:1 | 1:32-1:4 |
| 2 (Enantiomer A) | Fenoxaprop-ethyl | 1:120-10:1 | 1:40-4:1 | 1:15-1:2 |
| 2 (Enantiomer A) | Fenoxasulfone | 1:85-14:1 | 1:28-5:1 | 1:10-1:2 |
| 2 (Enantiomer A) | Fenquinotrione | 1:17-68:1 | 1:5-23:1 | 1:2-5:1 |
| 2 (Enantiomer A) | Fentrazamide | 1:17-68:1 | 1:5-23:1 | 1:2-5:1 |
| 2 (Enantiomer A) | Flazasulfuron | 1:17-68:1 | 1:5-23:1 | 1:2-5:1 |
| 2 (Enantiomer A) | Florasulam | 1:2-420:1 | 1:1-140:1 | 2:1-27:1 |
| 2 (Enantiomer A) | Fluazifop-butyl | 1:192-6:1 | 1:64-2:1 | 1:24-1:3 |
| 2 (Enantiomer A) | Flucarbazone | 1:8-135:1 | 1:2-45:1 | 1:1-9:1 |
| 2 (Enantiomer A) | Flucetosulfuron | 1:8-135:1 | 1:2-45:1 | 1:1-9:1 |
| 2 (Enantiomer A) | Flufenacet | 1:257-5:1 | 1:85-2:1 | 1:32-1:4 |
| 2 (Enantiomer A) | Flumetsulam | 1:24-48:1 | 1:8-16:1 | 1:3-3:1 |
| 2 (Enantiomer A) | Flumiclorac-pentyl | 1:10-112:1 | 1:3-38:1 | 1:1-7:1 |
| 2 (Enantiomer A) | Flumioxazin | 1:25-45:1 | 1:8-15:1 | 1:3-3:1 |
| 2 (Enantiomer A) | Fluometuron | 1:384-3:1 | 1:128-1:1 | 1:48-1:6 |
| 2 (Enantiomer A) | Flupyrsulfuron-methyl | 1:3-336:1 | 1:1-112:1 | 2:1-21:1 |
| 2 (Enantiomer A) | Fluridone | 1:384-3:1 | 1:128-1:1 | 1:48-1:6 |
| 2 (Enantiomer A) | Fluroxypyr | 1:96-12:1 | 1:32-4:1 | 1:12-1:2 |
| 2 (Enantiomer A) | Flurtamone | 1:857-2:1 | 1:285-1:3 | 1:107-1:12 |
| 2 (Enantiomer A) | Fluthiacet-methyl | 1:48-42:1 | 1:16-14:1 | 1:3-3:1 |
| 2 (Enantiomer A) | Fomesafen | 1:96-12:1 | 1:32-4:1 | 1:12-1:2 |
| 2 (Enantiomer A) | Foramsulfuron | 1:13-84:1 | 1:4-28:1 | 1:1-6:1 |
| 2 (Enantiomer A) | Glufosinate | 1:288-4:1 | 1:96-2:1 | 1:36-1:4 |
| 2 (Enantiomer A) | Glyphosate | 1:288-4:1 | 1:96-2:1 | 1:36-1:4 |
| 2 (Enantiomer A) | Halosulfuron-methyl | 1:17-68:1 | 1:5-23:1 | 1:2-5:1 |
| 2 (Enantiomer A) | Halauxifen | 1:20-56:1 | 1:6-19:1 | 1:2-4:1 |
| 2 (Enantiomer A) | Halauxifen methyl | 1:20-56:1 | 1:6-19:1 | 1:2-4:1 |
| 2 (Enantiomer A) | Haloxyfop-methyl | 1:34-34:1 | 1:11-12:1 | 1:4-3:1 |
| 2 (Enantiomer A) | Hexazinone | 1:192-6:1 | 1:64-2:1 | 1:24-1:3 |

TABLE A1-continued

| Component (a) (Compound No.) | Component (b) | Typical Weight Ratio | More Typical Weight Ratio | Most Typical Weight Ratio |
|---|---|---|---|---|
| 2 (Enantiomer A) | Hydantocidin | 1:1100-16:1 | 1:385-8:1 | 1:144-4:1 |
| 2 (Enantiomer A) | Imazamox | 1:13-84:1 | 1:4-28:1 | 1:1-6:1 |
| 2 (Enantiomer A) | Imazapic | 1:20-56:1 | 1:6-19:1 | 1:2-4:1 |
| 2 (Enantiomer A) | Imazapyr | 1:85-14:1 | 1:28-5:1 | 1:10-1:2 |
| 2 (Enantiomer A) | Imazaquin | 1:34-34:1 | 1:11-12:1 | 1:4-3:1 |
| 2 (Enantiomer A) | Imazethabenz-methyl | 1:171-7:1 | 1:57-3:1 | 1:21-1:3 |
| 2 (Enantiomer A) | Imazethapyr | 1:24-48:1 | 1:8-16:1 | 1:3-3:1 |
| 2 (Enantiomer A) | Imazosulfuron | 1:27-42:1 | 1:9-14:1 | 1:3-3:1 |
| 2 (Enantiomer A) | Indanofan | 1:342-4:1 | 1:114-2:1 | 1:42-1:5 |
| 2 (Enantiomer A) | Indaziflam | 1:25-45:1 | 1:8-15:1 | 1:3-3:1 |
| 2 (Enantiomer A) | Iodosulfuron-methyl | 1:3-336:1 | 1:1-112:1 | 2:1-21:1 |
| 2 (Enantiomer A) | Ioxynil | 1:192-6:1 | 1:64-2:1 | 1:24-1:3 |
| 2 (Enantiomer A) | Ipfencarbazone | 1:85-14:1 | 1:28-5:1 | 1:10-1:2 |
| 2 (Enantiomer A) | Isoproturon | 1:384-3:1 | 1:128-1:1 | 1:48-1:6 |
| 2 (Enantiomer A) | Isoxaben | 1:288-4:1 | 1:96-2:1 | 1:36-1:4 |
| 2 (Enantiomer A) | Isoxaflutole | 1:60-20:1 | 1:20-7:1 | 1:7-2:1 |
| 2 (Enantiomer A) | Lactofen | 1:42-27:1 | 1:14-9:1 | 1:5-2:1 |
| 2 (Enantiomer A) | Lenacil | 1:384-3:1 | 1:128-1:1 | 1:48-1:6 |
| 2 (Enantiomer A) | Linuron | 1:384-3:1 | 1:128-1:1 | 1:48-1:6 |
| 2 (Enantiomer A) | MCPA | 1:192-6:1 | 1:64-2:1 | 1:24-1:3 |
| 2 (Enantiomer A) | MCPB | 1:288-4:1 | 1:96-2:1 | 1:36-1:4 |
| 2 (Enantiomer A) | Mecoprop | 1:768-2:1 | 1:256-1:2 | 1:96-1:11 |
| 2 (Enantiomer A) | Mefenacet | 1:384-3:1 | 1:128-1:1 | 1:48-1:6 |
| 2 (Enantiomer A) | Mefluidide | 1:192-6:1 | 1:64-2:1 | 1:24-1:3 |
| 2 (Enantiomer A) | Mesosulfuron-methyl | 1:5-224:1 | 1:1-75:1 | 1:1-14:1 |
| 2 (Enantiomer A) | Mesotrione | 1:42-27:1 | 1:14-9:1 | 1:5-2:1 |
| 2 (Enantiomer A) | Metamifop | 1:42-27:1 | 1:14-9:1 | 1:5-2:1 |
| 2 (Enantiomer A) | Metazachlor | 1:384-3:1 | 1:128-1:1 | 1:48-1:6 |
| 2 (Enantiomer A) | Metazosulfuron | 1:25-45:1 | 1:8-15:1 | 1:3-3:1 |
| 2 (Enantiomer A) | Methabenzthiazuron | 1:768-2:1 | 1:256-1:2 | 1:96-1:11 |
| 2 (Enantiomer A) | Metolachlor | 1:768-2:1 | 1:256-1:2 | 1:96-1:11 |
| 2 (Enantiomer A) | Metosulam | 1:8-135:1 | 1:2-45:1 | 1:1-9:1 |
| 2 (Enantiomer A) | Metribuzin | 1:192-6:1 | 1:64-2:1 | 1:24-1:3 |
| 2 (Enantiomer A) | Metsulfuron-methyl | 1:2-560:1 | 1:1-187:1 | 3:1-35:1 |
| 2 (Enantiomer A) | Molinate | 1:1028-2:1 | 1:342-1:3 | 1:128-1:15 |
| 2 (Enantiomer A) | Napropamide | 1:384-3:1 | 1:128-1:1 | 1:48-1:6 |
| 2 (Enantiomer A) | Napropamide-M | 1:192-6:1 | 1:64-2:1 | 1:24-1:3 |
| 2 (Enantiomer A) | Naptalam | 1:192-6:1 | 1:64-2:1 | 1:24-1:3 |
| 2 (Enantiomer A) | Nicosulfuron | 1:12-96:1 | 1:4-32:1 | 1:1-6:1 |
| 2 (Enantiomer A) | Norflurazon | 1:1152-1:1 | 1:384-1:3 | 1:144-1:16 |
| 2 (Enantiomer A) | Orbencarb | 1:1371-1:2 | 1:457-1:4 | 1:171-1:20 |
| 2 (Enantiomer A) | Orthosulfamuron | 1:20-56:1 | 1:6-19:1 | 1:2-4:1 |
| 2 (Enantiomer A) | Oryzalin | 1:514-3:1 | 1:171-1:2 | 1:64-1:8 |
| 2 (Enantiomer A) | Oxadiargyl | 1:384-3:1 | 1:128-1:1 | 1:48-1:6 |
| 2 (Enantiomer A) | Oxadiazon | 1:548-3:1 | 1:182-1:2 | 1:68-1:8 |
| 2 (Enantiomer A) | Oxasulfuron | 1:27-42:1 | 1:9-14:1 | 1:3-3:1 |
| 2 (Enantiomer A) | Oxaziclomefone | 1:42-27:1 | 1:14-9:1 | 1:5-2:1 |
| 2 (Enantiomer A) | Oxyfluorfen | 1:384-3:1 | 1:128-1:1 | 1:48-1:6 |
| 2 (Enantiomer A) | Paraquat | 1:192-6:1 | 1:64-2:1 | 1:24-1:3 |
| 2 (Enantiomer A) | Pendimethalin | 1:384-3:1 | 1:128-1:1 | 1:48-1:6 |
| 2 (Enantiomer A) | Penoxsulam | 1:10-112:1 | 1:3-38:1 | 1:1-7:1 |
| 2 (Enantiomer A) | Penthoxamid | 1:384-3:1 | 1:128-1:1 | 1:48-1:6 |
| 2 (Enantiomer A) | Pentoxazone | 1:102-12:1 | 1:34-4:1 | 1:12-1:2 |
| 2 (Enantiomer A) | Phenmedipham | 1:102-12:1 | 1:34-4:1 | 1:12-1:2 |
| 2 (Enantiomer A) | Picloram | 1:96-12:1 | 1:32-4:1 | 1:12-1:2 |
| 2 (Enantiomer A) | Picolinafen | 1:34-34:1 | 1:11-12:1 | 1:4-3:1 |
| 2 (Enantiomer A) | Pinoxaden | 1:25-45:1 | 1:8-15:1 | 1:3-3:1 |
| 2 (Enantiomer A) | Pretilachlor | 1:192-6:1 | 1:64-2:1 | 1:24-1:3 |
| 2 (Enantiomer A) | Primisulfuron-methyl | 1:8-135:1 | 1:2-45:1 | 1:1-9:1 |
| 2 (Enantiomer A) | Prodiamine | 1:384-3:1 | 1:128-1:1 | 1:48-1:6 |
| 2 (Enantiomer A) | Profoxydim | 1:42-27:1 | 1:14-9:1 | 1:5-2:1 |
| 2 (Enantiomer A) | Prometryn | 1:384-3:1 | 1:128-1:1 | 1:48-1:6 |
| 2 (Enantiomer A) | Propachlor | 1:1152-1:1 | 1:384-1:3 | 1:144-1:16 |
| 2 (Enantiomer A) | Propanil | 1:384-3:1 | 1:128-1:1 | 1:48-1:6 |
| 2 (Enantiomer A) | Propaquizafop | 1:48-24:1 | 1:16-8:1 | 1:6-2:1 |
| 2 (Enantiomer A) | Propoxycarbazone | 1:17-68:1 | 1:5-23:1 | 1:2-5:1 |
| 2 (Enantiomer A) | Propyrisulfuron | 1:17-68:1 | 1:5-23:1 | 1:2-5:1 |
| 2 (Enantiomer A) | Propyzamide | 1:384-3:1 | 1:128-1:1 | 1:48-1:6 |
| 2 (Enantiomer A) | Prosulfocarb | 1:1200-1:2 | 1:400-1:4 | 1:150-1:17 |
| 2 (Enantiomer A) | Prosulfuron | 1:6-168:1 | 1:2-56:1 | 1:1-11:1 |
| 2 (Enantiomer A) | Pyraclonil | 1:42-27:1 | 1:14-9:1 | 1:5-2:1 |
| 2 (Enantiomer A) | Pyraflufen-ethyl | 1:5-224:1 | 1:1-75:1 | 1:1-14:1 |
| 2 (Enantiomer A) | Pyrasulfotole | 1:13-84:1 | 1:4-28:1 | 1:1-6:1 |
| 2 (Enantiomer A) | Pyrazolynate | 1:857-2:1 | 1:285-1:3 | 1:107-1:12 |
| 2 (Enantiomer A) | Pyrazosulfuron-ethyl | 1:10-112:1 | 1:3-38:1 | 1:1-7:1 |
| 2 (Enantiomer A) | Pyrazoxyfen | 1:5-224:1 | 1:1-75:1 | 1:1-14:1 |
| 2 (Enantiomer A) | Pyribenzoxim | 1:10-112:1 | 1:3-38:1 | 1:1-7:1 |

TABLE A1-continued

| Component (a) (Compound No.) | Component (b) | Typical Weight Ratio | More Typical Weight Ratio | Most Typical Weight Ratio |
|---|---|---|---|---|
| 2 (Enantiomer A) | Pyributicarb | 1:384-3:1 | 1:128-1:1 | 1:48-1:6 |
| 2 (Enantiomer A) | Pyridate | 1:288-4:1 | 1:96-2:1 | 1:36-1:4 |
| 2 (Enantiomer A) | Pyriftalid | 1:10-112:1 | 1:3-38:1 | 1:1-7:1 |
| 2 (Enantiomer A) | Pyriminobac-methyl | 1:20-56:1 | 1:6-19:1 | 1:2-4:1 |
| 2 (Enantiomer A) | Pyrimisulfan | 1:17-68:1 | 1:5-23:1 | 1:2-5:1 |
| 2 (Enantiomer A) | Pyrithiobac | 1:24-48:1 | 1:8-16:1 | 1:3-3:1 |
| 2 (Enantiomer A) | Pyroxasulfone | 1:85-14:1 | 1:28-5:1 | 1:10-1:2 |
| 2 (Enantiomer A) | Pyroxsulam | 1:5-224:1 | 1:1-75:1 | 1:1-14:1 |
| 2 (Enantiomer A) | Quinclorac | 1:192-6:1 | 1:64-2:1 | 1:24-1:3 |
| 2 (Enantiomer A) | Quizalofop-ethyl | 1:42-27:1 | 1:14-9:1 | 1:5-2:1 |
| 2 (Enantiomer A) | Rimsulfuron | 1:13-84:1 | 1:4-28:1 | 1:1-6:1 |
| 2 (Enantiomer A) | Saflufenacil | 1:25-45:1 | 1:8-15:1 | 1:3-3:1 |
| 2 (Enantiomer A) | Sethoxydim | 1:96-12:1 | 1:32-4:1 | 1:12-1:2 |
| 2 (Enantiomer A) | Simazine | 1:384-3:1 | 1:128-1:1 | 1:48-1:6 |
| 2 (Enantiomer A) | Sulcotrione | 1:120-10:1 | 1:40-4:1 | 1:15-1:2 |
| 2 (Enantiomer A) | Sulfentrazone | 1:147-8:1 | 1:49-3:1 | 1:18-1:3 |
| 2 (Enantiomer A) | Sulfometuron-methyl | 1:34-34:1 | 1:11-12:1 | 1:4-3:1 |
| 2 (Enantiomer A) | Sulfosulfuron | 1:8-135:1 | 1:2-45:1 | 1:1-9:1 |
| 2 (Enantiomer A) | Tebuthiuron | 1:384-3:1 | 1:128-1:1 | 1:48-1:6 |
| 2 (Enantiomer A) | Tefuryltrione | 1:42-27:1 | 1:14-9:1 | 1:5-2:1 |
| 2 (Enantiomer A) | Tembotrione | 1:31-37:1 | 1:10-13:1 | 1:3-3:1 |
| 2 (Enantiomer A) | Tepraloxydim | 1:25-45:1 | 1:8-15:1 | 1:3-3:1 |
| 2 (Enantiomer A) | Terbacil | 1:288-4:1 | 1:96-2:1 | 1:36-1:4 |
| 2 (Enantiomer A) | Terbuthylazine | 1:857-2:1 | 1:285-1:3 | 1:107-1:12 |
| 2 (Enantiomer A) | Terbutryn | 1:192-6:1 | 1:64-2:1 | 1:24-1:3 |
| 2 (Enantiomer A) | Thenylchlor | 1:85-14:1 | 1:28-5:1 | 1:10-1:2 |
| 2 (Enantiomer A) | Thiazopyr | 1:384-3:1 | 1:128-1:1 | 1:48-1:6 |
| 2 (Enantiomer A) | Thiencarbazone | 1:3-336:1 | 1:1-112:1 | 2:1-21:1 |
| 2 (Enantiomer A) | Thifensulfuron-methyl | 1:5-224:1 | 1:1-75:1 | 1:1-14:1 |
| 2 (Enantiomer A) | Tiafenacil | 1:17-68:1 | 1:5-23:1 | 1:2-5:1 |
| 2 (Enantiomer A) | Thiobencarb | 1:768-2:1 | 1:256-1:2 | 1:96-1:11 |
| 2 (Enantiomer A) | Tolpyralate | 1:31-37:1 | 1:10-13:1 | 1:3-3:1 |
| 2 (Enantiomer A) | Topramzone | 1:6-168:1 | 1:2-56:1 | 1:1-11:1 |
| 2 (Enantiomer A) | Tralkoxydim | 1:68-17:1 | 1:22-6:1 | 1:8-2:1 |
| 2 (Enantiomer A) | Triafamone | 1:2-420:1 | 1:1-140:1 | 2:1-27:1 |
| 2 (Enantiomer A) | Triallate | 1:768-2:1 | 1:256-1:2 | 1:96-1:11 |
| 2 (Enantiomer A) | Triasulfuron | 1:5-224:1 | 1:1-75:1 | 1:1-14:1 |
| 2 (Enantiomer A) | Triaziflam | 1:171-7:1 | 1:57-3:1 | 1:21-1:3 |
| 2 (Enantiomer A) | Tribenuron-methyl | 1:3-336:1 | 1:1-112:1 | 2:1-21:1 |
| 2 (Enantiomer A) | Triclopyr | 1:192-6:1 | 1:64-2:1 | 1:24-1:3 |
| 2 (Enantiomer A) | Trifloxysulfuron | 1:2-420:1 | 1:1-140:1 | 2:1-27:1 |
| 2 (Enantiomer A) | Trifludimoxazin | 1:25-45:1 | 1:8-15:1 | 1:3-3:1 |
| 2 (Enantiomer A) | Trifluralin | 1:288-4:1 | 1:96-2:1 | 1:36-1:4 |
| 2 (Enantiomer A) | Triflusulfuron-methyl | 1:17-68:1 | 1:5-23:1 | 1:2-5:1 |
| 2 (Enantiomer A) | Tritosulfuron | 1:13-84:1 | 1:4-28:1 | 1:1-6:1 |

Table A2 is constructed the same as Table A1 above except that entries below the "Component (a) (Compound No.)" column heading are replaced with the respective Component (a) Column Entry shown below. Compound No. in the Component (a) column is identified in Index Table 1. Thus, for example, in Table A2 the entries below the "Component (a)" column heading all recite "2 (Enantiomer B)" (Compound No. 2 identified in Index Table 1), and the first line below the column headings in Table A2 specifically discloses a mixture of Compound No. 2 (Enantiomer B) with 2,4-D.

| Table Number | Component (a) Column Entries |
|---|---|
| A2 | 2 (Enantiomer 2B) |
| A3 | 3 (Enantiomer 3A) |
| A4 | 3 (Enantiomer 3B) |
| A5 | 4 (Enantiomer 4A) |
| A6 | 4 (Enantiomer 4B) |
| A7 | 5 (Enantiomer 5B) |
| A8 | 5 (Enantiomer 5A) |

In certain instances, combinations of a compound of this disclosure with other biologically active (particularly herbicidal) compounds or agents (i.e. active ingredients) can result in a greater-than-additive (i.e. synergistic) effect on weeds and/or a less-than-additive effect (i.e. safening) on crops or other desirable plants. Reducing the quantity of active ingredients released in the environment while ensuring effective pest control is always desirable. Ability to use greater amounts of active ingredients to provide more effective weed control without excessive crop injury is also desirable. When synergism of herbicidal active ingredients occurs on weeds at application rates giving agronomically satisfactory levels of weed control, such combinations can be advantageous for reducing crop production cost and decreasing environmental load. When safening of herbicidal active ingredients occurs on crops, such combinations can be advantageous for increasing crop protection by reducing weed competition.

Of note is a combination of a compound of the disclosure with at least one other herbicidal active ingredient. Of particular note is such a combination where the other herbicidal active ingredient has different site of action from the compound of the disclosure. In certain instances, a combination with at least one other herbicidal active ingredient having a similar spectrum of control but a different site of action will be particularly advantageous for resistance management. Thus, a composition of the present disclosure can further comprise (in a herbicidally effective amount) at least one additional herbicidal active ingredient having a similar spectrum of control but a different site of action.

Compounds of this disclosure can also be used in combination with herbicide safeners such as allidochlor, benoxacor, cloquintocet-mexyl, cumyluron, cyometrinil, cyprosulfonamide, daimuron, dichlormid, dicyclonon, dietholate, dimepiperate, fenchlorazole-ethyl, fenclorim, flurazole, fluxofenim, furilazole, isoxadifen-ethyl, mefenpyr-diethyl, mephenate, methoxyphenone naphthalic anhydride (1,8-naphthalic anhydride), oxabetrinil, N-(aminocarbonyl)-2-methylbenzenesulfonamide, N-(aminocarbonyl)-2-fluorobenzenesulfonamide, 1-bromo-4-Rchloromethyl) sulfonyllbenzene (BCS), 4-(dichloroacetyl)-1-oxa-4-azospiro[4.5]decane (MON 4660), 2-(dichloromethyl)-2-methyl-1,3-dioxolane (MG 191), ethyl 1,6-dihydro-1-(2-methoxyphenyl)-6-oxo-2-phenyl-5-pyrimidinecarboxylate, 2-hydroxy-N,N-dimethyl-6-(trifluoromethyl)pyridine-3-carboxamide, 1-(3,4-dimethylphenyl)-1,6-dihydro-6-oxo-2-phenyl-5-pyrimidinecarboxylate, 2,2-dichloro-1-(2,2,5-trimethyl-3-oxazolidinyl)-ethanone and 2-methoxy-N-[[4-[[(methylamino)carbonyl]amino]phenyl]sulfonyl]-benzamide. Antidotally to increase safety to certain crops. Antidotally effective amounts of the herbicide safeners can be applied at the same time as the compounds of this disclosure or applied as seed treatments. Therefore an aspect of the present disclosure relates to a herbicidal mixture comprising a compound of this disclosure and an antidotally effective amount of a herbicide safener. Seed treatment is particularly useful for selective weed control, because it physically restricts antidoting to the crop plants. Therefore a particularly useful embodiment of the present disclosure is a method for selectively controlling the growth of undesired vegetation in a crop comprising contacting the locus of the crop with a herbicidally effective amount of a compound of this disclosure wherein seed from which the crop is grown is treated with an antidotally effective amount of safener. Antidotally effective amounts of safeners can be easily determined by one skilled in the art through simple experimentation.

Compounds of the disclosure cans also be mixed with: (1) polynucleotides including but not limited to DNA, RNA, and/or chemically modified nucleotides influencing the amount of a particular target through down regulation, interference, suppression or silencing of the genetically derived transcript that render a herbicidal effect; or (2) polynucleotides including but not limited to DNA, RNA, and/or chemically modified nucleotides influencing the amount of a particular target through down regulation, interference, suppression or silencing of the genetically derived transcript that render a safening effect.

The following Test A demonstrate the control efficacy of representative compounds of this disclosure against representative weeds, but the weed control afforded by these compounds is not limited to these species. See Index Table 1 for compound descriptions.

| INDEX TABLE 1 |
|---|

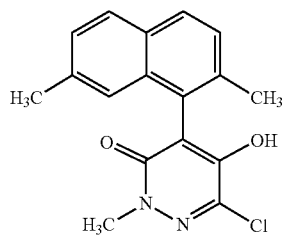 [SMILES: Cc1ccc2ccc(C)c(-c3c(O)c(Cl)nn(C)c3=O)c2c1]

| INDEX TABLE 1 |
|---|

2 (Enantiomer 2A)
(−) stereoisomer

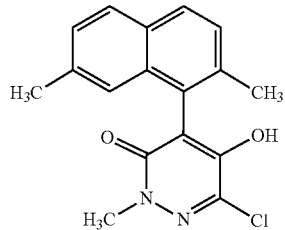 [SMILES: Cc1ccc2ccc(C)c(-c3c(O)c(Cl)nn(C)c3=O)c2c1]

2 (Enantiomer 2B)
(+) stereoisomer

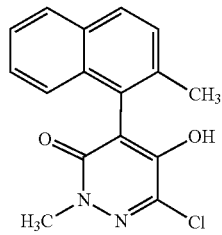 [SMILES: Cc1ccc2ccccc2c1-c1c(O)c(Cl)nn(C)c1=O]

3 (Enantiomer 3A)

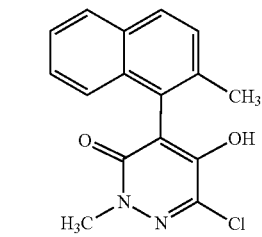 [SMILES: Cc1ccc2ccccc2c1-c1c(O)c(Cl)nn(C)c1=O]

3 (Enantiomer 3B)

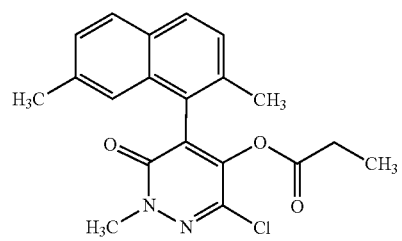 [SMILES: CCC(=O)Oc1c(Cl)nn(C)c(=O)c1-c1c(C)ccc2ccc(C)cc12]

4 (Enantiomer 4A)
(−) stereoisomer

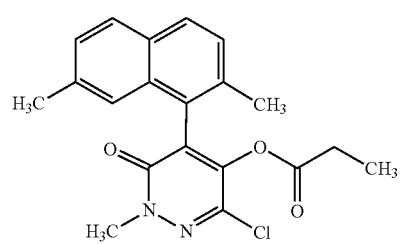

4 (Enantiomer 4B)
(+) stereoisomer

INDEX TABLE 1

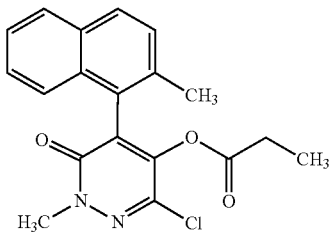 [SMILES: CCC(=O)Oc1c(Cl)nn(C)c(=O)c1-c1c(C)ccc2ccccc12]

5 (Enantiomer 5A)
(−) stereoisomer

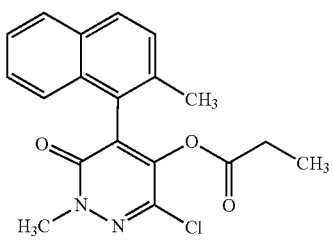 [SMILES: CCC(=O)Oc1c(Cl)nn(C)c(=O)c1-c1c(C)ccc2ccccc12]

5 (Enantiomer 5B)
(+) stereoisomer

Test A

Seeds of plant species selected from barnyardgrass (BYG, *Echinochloa crus-galli*), kochia (KOC, *Kochia scoparia*), ragweed (common ragweed, *Ambrosia elatior*), ryegrass, Italian (RGI, *Lolium multiflorum*), foxtail, giant (FTI, *Setaria faberii*), foxtail, green (*Setaria viridis*) and pigweed (PWR, *Amaranthus retroflexus*) were planted into a blend of loam soil and sand and treated preemergence with a directed soil spray using test chemicals formulated in a non-phytotoxic solvent mixture which included a surfactant.

At the same time, plants selected from these weed species and also wheat (WWT, *Triticum aestivum*), corn (CPI, *Zea mays*), blackgrass (BKG, *Alopecurus myosuroides*) and galium (GAL, catchweed bedstraw, *Galium aparine*) were planted in pots containing the same blend of loam soil and sand and treated with postemergence applications of test chemicals formulated in the same manner Plants ranged in height from 2 to 10 cm and were in the one- to two-leaf stage for the postemergence treatment. Treated plants and untreated controls were maintained in a greenhouse for approximately 10 d, after which time all treated plants were compared to untreated controls and visually evaluated for injury. Plant response ratings, summarized in Tables 1-4, are based on a 0 to 100 scale where 0 is no effect and 100 is complete control. A dash (−) response means no test result. The ratings are followed by a letter representing the symptomology where S is Albinism, C is Chlorosis, G is Growth Inhibition and E is Emergence.

TABLE 1

Postemergence (POST) and Preemergence (PRE) Activity of Enantiomers Comprising Racemate 2 at 125 and 31 grams/hectare.

| | | Rate | Crops | | Dicot Weeds | | | | Monocot Weeds | | | |
|---|---|---|---|---|---|---|---|---|---|---|---|---|
| | App | g ai/ha | CPI | WWT | GAL | KOC | PWR | RWC | BKG | RGI | BYG | FTI |
| Enantiomer A | POST | 125 | 30 G | 0 | 100 C | 80 S | 100 C | 90 S | 20 S | 40 S | 30 C | 60 S |
| | | 31 | 10 G | 0 | 100 C | 60 S | 100 C | 90 S | 0 | 30 S | 20 C | 30 S |
| | PRE | 125 | | | | 80 S | 100 C | | | 20 G | 50 G | 40 S |
| | | 31 | | | | 10 C | 100 C | | | 20 G | 0 | 20 S |
| Enantiomer B | POST | 125 | 30 G | 30 S | 90 C | 70 S | 100 C | 100 C | 40 S | 100 C | 90 C | 90 S |
| | | 31 | 0 | 0 | 100 C | 60 S | 100 C | 100 C | 30 C | 100 C | 80 C | 80 S |
| | PRE | 125 | | | | 90 C | 100 C | | | 100 S | 100 C | 100 C |
| | | 31 | | | | 0 | 100 C | | | 80 S | 90 S | 100 C |

TABLE 2

Postemergence (POST) and Preemergence (PRE) Activity of Enantiomers
Comprising Racemate 3 at 125 and 31 grams/hectare.

| | | Rate | Crops | | Dicot Weeds | | | | Monocot Weeds | | | |
|---|---|---|---|---|---|---|---|---|---|---|---|---|
| | App | g ai/ha | CPI | WWT | GAL | KOC | PWR | RWC | BKG | RGI | BYG | FTI |
| 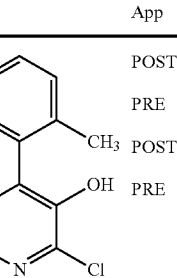<br>3<br>Enantiomer A | POST | 125 | 10 G | 0 | 100 C | 90 S | 100 C | 100 C | 0 | 40 S | 60 S | 60 S |
| | | 31 | 0 | 0 | 90 C | 80 S | 90 C | 60 C | 0 | 10 S | 20 S | 20 S |
| | PRE | 125 | | | 90 G | 100 E | 100 E | | | 80 S | 50 S | 60 S |
| | | 31 | | | 20 S | 90 C | 50 S | | | 10 S | 10 S | 10 S |
| | POST | 125 | 20 G | 10 S | 100 C | 90 S | 100 C | 100 C | 20 S | 80 S | 50 S | 50 S |
| | | 31 | 10 G | 0 | 100 C | 60 S | 100 C | 90 C | 10 S | 30 G | 10 S | 20 S |
| | PRE | 125 | | | 100 S | 100 E | 100 E | | | 50 S | 50 S | 70 S |
| | | 31 | | | 70 S | 100 C | 80 S | | | 10 S | 20 G | 20 S |
| 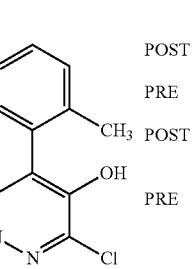<br>3<br>Enantiomer B | POST | 125 | 20 S | 30 S | 100 C | 90 S | 100 C | 90 S | 20 S | 100 S | 90 S | 90 S |
| | | 31 | 10 C | 0 | 100 C | 50 S | 100 C | 100 C | 0 | 100 S | 70 S | 70 S |
| | PRE | 125 | | | 90 S | 100 E | 100 E | | | 100 C | 90 S | 100 C |
| | | 31 | | | 10 S | 90 C | 80 S | | | 100 C | 80 S | 90 S |
| | POST | 1000 | 50 S | 90 S | 100 C | 100 C | 100 C | 90 S | 80 S | 100 S | 90 S | 100 S |
| | | 125 | 10 G | 30 S | 100 C | 90 S | 100 C | 100 C | 20 G | 100 S | 90 C | 90 S |
| | | 31 | 10 G | 0 | 100 C | 80 S | 100 C | 100 C | 0 | 90 S | 60 S | 90 S |
| | PRE | 1000 | | | 100 C | 100 C | 100 E | | | 100 S | 100 C | 100 C |
| | | 125 | | | 80 S | 100 E | 100 E | | | 90 S | 100 C | 100 C |
| | | 31 | | | 10 S | 90 C | 100 E | | | 40 S | 80 S | 80 S |

TABLE 3

Postemergence (POST) and Preemergence (PRE) Activity of Enantiomers
Comprising Racemate 4 at 125 and 31 grams/hectare.

| | | Rate | Crops | | Dicot Weeds | | | | Monocot Weeds | | | |
|---|---|---|---|---|---|---|---|---|---|---|---|---|
| | App | g ai/ha | CPI | WWT | GAL | KOC | PWR | RWC | BKG | RGI | BYG | FTI |
| 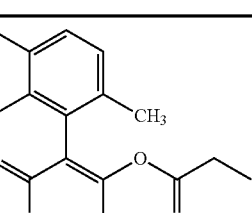<br>4<br>Enantiomer A | POST | 125 | 0 | 0 | 100 C | 60 S | 100 C | 90 C | 10 C | 20 C | 30 C | 30 S |
| | | 31 | 0 | 0 | 80 S | 50 S | 90 S | 80 S | 10 C | 10 C | 0 | 0 |
| | PRE | 125 | | | | 50 S | 90 C | | | 10 C | 0 | 10 S |
| | | 31 | | | | 10 C | 90 C | | | 0 | 0 | 0 |
| 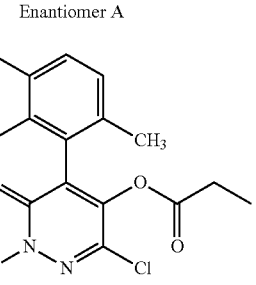<br>4<br>Enantiomer B | POST | 125 | 10 S | 20 S | 100 C | 50 S | 100 C | 100 C | 70 S | 90 C | 90 S | 90 S |
| | | 31 | 10 G | 0 | 100 C | 50 S | 100 C | 90 C | 20 S | 80 C | 70 S | 80 S |
| | PRE | 125 | | | | 70 S | 100 C | | | 90 C | 100 C | 100 C |
| | | 31 | | | | 10 C | 100 C | | | 80 S | 100 C | 100 C |

TABLE 4

Postemergence (POST) and Preemergence (PRE) Activity of Enantiomers
Comprising Racemate 5 at 125 and 31 grams/hectare.

| | | Rate | Crops | | Dicot Weeds | | | | Monocot Weeds | | | |
|---|---|---|---|---|---|---|---|---|---|---|---|---|
| | App | g ai/ha | CPI | WWT | GAL | KOC | PWR | RWC | BKG | RGI | BYG | FTI |
| | POST | 125 | 10 S | 0 | 100 S | 80 S | 90 S | 90 S | 0 | 70 C | 30 S | 20 S |
| | | 125 | 0 | 0 | 100 S | 70 S | 90 S | 90 S | 30 S | 80 S | 20 S | 30 S |
| | | 62 | 0 | 0 | 100 S | 80 S | 90 S | 90 S | 0 | 50 S | 0 | 10 S |
| | | 31 | 0 | 0 | 90 S | 70 S | 90 S | 90 S | 0 | 20 G | 0 | 10 S |
| | | 31 | 0 | 0 | 90 S | 70 S | 90 S | 90 S | 0 | 20 S | 10 S | 10 S |
| | | 16 | 0 | 0 | 90 S | 70 S | 80 S | 80 S | 0 | 10 S | 0 | 10 C |
| | PRE | 125 | | | | 80 S | 100 E | 100 C | | 30 S | 0 | 10 C |
| | | 125 | | | | 80 S | 100 C | 90 C | | 20 S | 10 S | 60 S |
| | | 62 | | | | 70 S | 90 C | 90 C | | 0 | 0 | 0 |
| | | 31 | | | | 20 S | 60 C | 20 S | | 0 | 0 | 0 |
| | | 31 | | | | 30 G | 100 C | 20 C | | 0 | 0 | 10 S |
| | | 16 | | | | 10 C | 10 C | 0 | | 0 | 0 | 0 |
| | POST | 125 | 20 S | 50 S | 100 S | 80 S | 100 S | 100 S | 50 S | 90 S | 80 S | 90 S |
| | | 125 | 30 C | 50 S | 100 S | 90 S | 100 S | 90 S | 80 S | 100 C | 90 S | 90 S |
| | | 62 | 0 | 10 S | 100 S | 70 S | 90 S | 90 S | 40 G | 80 C | 40 S | 60 S |
| | | 31 | 0 | 0 | 90 S | 70 S | 90 S | 90 S | 30 G | 70 C | 30 S | 60 S |
| | | 31 | 40 C | 20 G | 100 S | 70 S | 90 S | 90 S | 50 S | 80 C | 80 S | 50 S |
| | | 16 | 0 | 0 | 90 S | 50 S | 90 S | 90 S | 20 S | 40 C | 30 S | 20 S |
| | PRE | 125 | | | | 70 S | 100 E | 100 C | | 30 S | 80 S | 100 C |
| | | 125 | | | | 50 S | 100 E | 90 C | | 90 S | 80 C | 90 S |
| | | 62 | | | | 50 S | 60 G | 70 S | | 10 S | 0 | 30 S |
| | | 31 | | | | 60 S | 30 G | 70 S | | 0 | 10 S | 20 S |
| | | 31 | | | | 10 G | 100 E | 50 S | | 30 S | 30 S | 80 S |
| | | 16 | | | | 10 C | 0 | 20 S | | 0 | 0 | 0 |

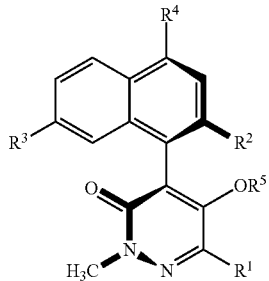

5
Enantiomer A

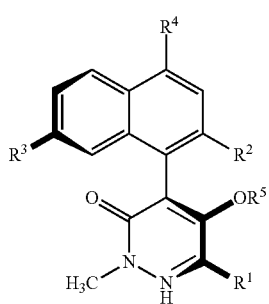

5
Enantiomer B

The invention claimed is:

1. An optically active compound selected from atropisomers of Formula 1a and Formula 1b:

1a

1b wherein
R$^1$ is Cl or CH$_3$,
R$^2$ is CH$_3$ or difluoromethoxy;
R$^3$ is CH$_3$ or H;
R$^4$ is H; and
R$^5$ is H or —(C═O)CH$_2$CH$_3$; and
wherein
the atropisomer of Formula 1a or 1b, has a plus (+) optical rotation value and is present in excess of its corresponding enantiomer.

2. The compound of claim 1 wherein
R$^1$ is Cl;
R$^2$ is CH$_3$;
R$^3$ is CH$_3$ or H;
R$^4$ is H; and
R$^5$ is H or —(C═O)CH$_2$CH$_3$.

3. The compound of claim 2 wherein
R$^1$ is Cl;
R$^2$ is CH$_3$;
R$^3$ is CH$_3$;
R$^4$ is H; and
R$^5$ is H.

4. A herbicidal composition comprising the compound of claim 1 and at least one component selected from the group consisting of surfactants, solid diluents, and liquid diluents.

5. A herbicidal composition comprising a compound of claim 1, at least one additional active ingredient selected from the group consisting of other herbicides and herbicide safeners, and at least one component selected from the group consisting of surfactants, solid diluents and liquid diluents.

6. A herbicidal mixture comprising (a) a compound of claim 1, and (b) at least one additional active ingredient.

7. A method for controlling the growth of undesired vegetation comprising contacting the vegetation or its environment with a herbicidally effective amount of a compound of claim 1.

8. A process for preparing a compound of Formula 1a or 1b

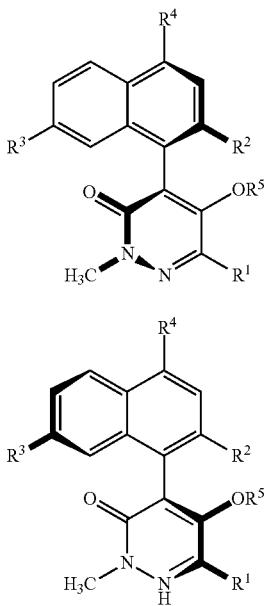

wherein
R¹ is Cl or $CH_3$;
R² is $CH_3$ or difluoromethoxy;
R³ is $CH_3$ or H;
R⁴ is H; and
R⁵ is H or —(C=O)$CH_2CH_3$;
the process comprising:
1) loading a racemic mixture of a compound of Formula 1 comprising the atropisomers of Formulae 1a and 1b onto a chiral supported supercritical fluid chromatography column and eluting with a mobile phase which comprises carbon dioxide;
2) isolating two separate fractions with different retention times; one containing an atropisomer with a positive optical rotation value $[\alpha]_1$ (+); and one atropisomer with a negative optical rotation value $[\alpha]_1$ (−).

9. The process of claim 8 wherein
R¹ is Cl;
R² is $CH_3$;
R³ is $CH_3$ or H;
R⁴ is ; and
R⁵ is H or —(C=O)$CH_2CH_3$.

10. The process of claim 9 wherein
R¹ is Cl;
R² is $CH_3$;
R³ is $CH_3$;
R⁴ is H; and
R⁵ is H.

* * * * *